United States Patent
Guo et al.

(10) Patent No.: US 11,749,798 B2
(45) Date of Patent: Sep. 5, 2023

(54) NANOPARTICLES COMPRISING A CORE COVERED WITH A PASSIVATION LAYER, PROCESS FOR MANUFACTURE AND USES THEREOF

(71) Applicants: HYDRO-QUÉBEC, Montréal (CA); TEKNA PLASMA SYSTEMS INC., Sherbrooke (CA)

(72) Inventors: Jiayin Guo, Sherbrooke (CA); Richard Dolbec, Varennes (CA); Maher Boulos, Sherbrooke (CA); Dominic Leblanc, Gentilly (CA); Abdelbast Guerfi, Brossard (CA); Karim Zaghib, Longueuil (CA)

(73) Assignees: HYDRO-QUEBEC, Montréal (CA); TEKNA PLASMA SYSTEMS INC., Sherbrooke (CA)

( * ) Notice: Subject to any disclaimer, the term of this patent is extended or adjusted under 35 U.S.C. 154(b) by 213 days.

(21) Appl. No.: 16/490,845

(22) PCT Filed: Mar. 2, 2018

(86) PCT No.: PCT/CA2018/050247
§ 371 (c)(1),
(2) Date: Sep. 3, 2019

(87) PCT Pub. No.: WO2018/157256
PCT Pub. Date: Sep. 7, 2018

(65) Prior Publication Data
US 2019/0381572 A1    Dec. 19, 2019

Related U.S. Application Data

(60) Provisional application No. 62/466,794, filed on Mar. 3, 2017, provisional application No. 62/466,769, filed on Mar. 3, 2017.

(51) Int. Cl.
*B32B 5/30* (2006.01)
*B22F 1/16* (2022.01)
(Continued)

(52) U.S. Cl.
CPC ............. *H01M 4/366* (2013.01); *B22F 1/054* (2022.01); *B22F 1/056* (2022.01); *B22F 1/102* (2022.01);
(Continued)

(58) Field of Classification Search
None
See application file for complete search history.

(56) References Cited

U.S. PATENT DOCUMENTS

| 4,379,777 A | 4/1983 | Boulos |
| 5,200,595 A | 4/1993 | Boulos et al. |

(Continued)

FOREIGN PATENT DOCUMENTS

| CN | 103241740 A | 8/2013 |
| CN | 103311511 A | 9/2013 |

(Continued)

OTHER PUBLICATIONS

Office Action (The First Office Action) dated May 24, 2021, by the State Intellectual Property Office of the People's Republic of China in corresponding Chinese Patent Application No. 201880029180.2 and an English Translation of the Office Action. (42 pages).

(Continued)

*Primary Examiner* — George Wyszomierski

(57) ABSTRACT

There is provided a method of manufacturing nanoparticles comprising the steps of feeding a core precursor into a plasma torch in a plasma reactor, thereby producing a vapor of silicon or alloy thereof; and allowing the vapor to migrate to a quenching zone of the plasma reactor, thereby cooling the vapor and allowing condensation of the vapor into a (Continued)

nanoparticle core made of the silicon or alloy thereof, wherein the quenching gas comprises a passivating gas precursor that reacts with the surface of the core in the quenching zone produce a passivation layer covering the core, thereby producing said nanoparticles. The present invention also relates to nanoparticles comprising a core covered with a passivation layer, the core being made of silicon or an alloy thereof, as well as their use, in particular in the manufacture of anodes.

19 Claims, 24 Drawing Sheets

(51) Int. Cl.
| | |
|---|---|
| *H01M 4/36* | (2006.01) |
| *B22F 9/04* | (2006.01) |
| *B22F 9/12* | (2006.01) |
| *B22F 9/30* | (2006.01) |
| *B22F 1/054* | (2022.01) |
| *B22F 1/102* | (2022.01) |
| *B22F 1/145* | (2022.01) |
| *B82Y 30/00* | (2011.01) |
| *B82Y 40/00* | (2011.01) |
| *H05H 1/30* | (2006.01) |

(52) U.S. Cl.
CPC ............ *B22F 1/145* (2022.01); *B22F 1/16* (2022.01); *B22F 9/04* (2013.01); *B22F 9/12* (2013.01); *B22F 9/30* (2013.01); *B32B 5/30* (2013.01); *B22F 2202/13* (2013.01); *B22F 2302/20* (2013.01); *B22F 2302/45* (2013.01); *B22F 2303/40* (2013.01); *B22F 2304/054* (2013.01); *B22F 2998/10* (2013.01); *B82Y 30/00* (2013.01); *B82Y 40/00* (2013.01); *H05H 1/30* (2013.01)

(56) References Cited

U.S. PATENT DOCUMENTS

| | | |
|---|---|---|
| 6,693,253 B2 | 2/2004 | Boulos et al. |
| 6,994,837 B2 | 2/2006 | Boulos et al. |
| 7,501,599 B2 | 3/2009 | Boulos et al. |
| 7,967,891 B2 | 6/2011 | Paserin et al. |
| 8,013,269 B2 | 9/2011 | Boulos et al. |
| 8,609,060 B1 | 12/2013 | Perry et al. |
| 8,859,931 B2 | 10/2014 | Boulos et al. |
| 9,380,693 B2 | 6/2016 | Boulos et al. |
| 9,516,734 B2 | 12/2016 | Boulos et al. |
| 2002/0155059 A1 | 10/2002 | Boulos et al. |
| 2005/0258419 A1* | 11/2005 | Sankaran ............ H01L 31/1804 257/40 |
| 2006/0051505 A1* | 3/2006 | Kortshagen ............ C01G 1/00 427/212 |
| 2009/0026421 A1* | 1/2009 | Li ......................... B22F 1/0018 252/500 |
| 2009/0056628 A1 | 3/2009 | Kortshagen et al. |
| 2012/0326089 A1* | 12/2012 | Anderson ............ C01B 33/03 252/301.36 |
| 2014/0246398 A1 | 9/2014 | Zaghib et al. |
| 2014/0315086 A1 | 10/2014 | Put et al. |
| 2014/0370293 A1 | 12/2014 | Johnson |
| 2015/0086870 A1 | 3/2015 | Fukasawa et al. |
| 2016/0141610 A1 | 5/2016 | Scoyer et al. |
| 2016/0164081 A1 | 6/2016 | Cui et al. |
| 2020/0044240 A1* | 2/2020 | Newbound ............ H01M 4/38 |

FOREIGN PATENT DOCUMENTS

| | | |
|---|---|---|
| CN | 103474666 A | 12/2013 |
| CN | 105489855 | 4/2016 |
| JP | 2008-508166 A | 3/2008 |
| JP | 2013-534899 A | 9/2013 |
| WO | 2012000854 A1 | 1/2012 |
| WO | 2016/102208 A1 | 6/2016 |
| WO | WO-2021/068084 A1 * | 4/2021 |

OTHER PUBLICATIONS

Dosaj, V., M. Kroupa, and R. Bittar, "Silicon and Silicon Alloys, Chemical and Metallurgical", in Kirk-Othmer Encyclopedia of Chemical Technology. 2000, John Wiley & Sons, Inc, 25 pages.

Guo, Jiayin et al., "Develpment of Nanopowder Synthesis Using Induction Plasma", Plasma Science and Technology, vol. 12, No. 2, pp. 188-199, Apr. 2010.

Leblanc, D. et al., "In situ transmission electron microscopy observations of lithiation of spherical silicon nanopowder produced by induced plasma atomization", Journal of Power Sources, 2015, 279(0): p. 522-527.

Leblanc, D., et al., "Silicon as anode for high-energy lithium ion batteries: From molten ingot to nanoparticles", Journal of Power Sources, 2015. 299: p. 529-536.

Murray, P.T. et al., "Nanomaterials produced by laser ablation techniques. Part 1: synthesis and passivation of nanoparticles" Proceedings of SPIE—The International Society for Optical Engineering (2006), vol. 61750D/1-61750D/8, Abstract.

Andersen, Hanne F. et al., "Surface Effects in Silicon Anodes", BILBOA Conference, Espagne, 1 page, 2015.

Office Action (Notice of Reasons for Refusal) dated Jan. 21, 2022, by the Japanese Patent Office in corresponding Japanese Patent Application No. 2019-547121, and an English Translation of the Office Action. (12 pages).

Extended European Search Report dated Sep. 2, 2020, issued by the European Patent Office in corresponding European Application No. 18761163.7-1103, (10 pages).

M. Boulos et al., Handbook of Thermal Plasmas, Chapter 1—The Plasma State, 2016, 53 pages.

\* cited by examiner (a)

(b)

(a)

(b)

(a)

(b)

NANOPARTICLES COMPRISING A CORE COVERED WITH A PASSIVATION LAYER, PROCESS FOR MANUFACTURE AND USES THEREOF

CROSS REFERENCE TO RELATED APPLICATIONS

This application is a U.S. national stage application of international application no. PCT/CA2018/050247, which claims benefit, under 35 U.S.C. § 119(e), of U.S. provisional application Ser. No. 62/466,769, filed on Mar. 3, 2017 and of U.S. provisional application Ser. No. 62/466,794, filed on Mar. 3, 2017. All documents above are incorporated herein in their entirety by reference.

FIELD OF THE INVENTION

This invention relates to a process for manufacturing nanoparticles comprising a core and a passivation layer covering the core, the core being made of silicon or an alloy thereof. This invention further relates to the nanoparticles as well as their use in the fabrication of an anode.

BACKGROUND OF THE INVENTION

The process of synthesizing nanoparticles using an induction plasma torch is known. Specifically, it is known to use an induction plasma torch to vaporize a material, and then to condense the resulting vapor to form nanoparticles. This general process is described in various US patents and applications, including U.S. Pat. No. 8,013,269, US 2012/201266A1, U.S. Pat. Nos. 6,994,837, 7,501,599, 8,859,931, and US 2002/155059A1, which are incorporated herein by reference.

Various induction plasma torches are also known, such as those described in U.S. Pat. Nos. 5,200,595, 9,380,693, or 6,693,253, which are incorporated herein by reference.

It is also known to use quench gases to help with the condensation of the vapor into nanoparticles.

Passivation layers, which are used to prevent unwanted reactions of compounds with their environments, are also known. Specifically, it is known to use passivation layers to protect against oxidation of surfaces.

Silicon nanopowders are also known, as well as the use thereof as an anode material to be used in lithium-ion anodes. The fabrication of such anodes can be accomplished, for example, in aqueous solutions using carbon black and sodium carboxymethyl cellulose (Na-CMC), or sodium alginate, as a binder.

It is also known to protect silicon nanopowder surfaces from the formation of $SiO_x$ by the deposition of an alumina coating ($Al_2O_3$) by atomic layer deposition (ALD) using trimethyl aluminum as precursor.

In addition, various methods of synthesizing silicon-based nanoparticles are known, such as using mechanical grinding (dry and wet) on metallurgical grade silicon (MG-Si) or using inductively-coupled plasma.

SUMMARY OF THE INVENTION

In accordance with the present invention, there is provided:

1. A method of manufacturing nanoparticles, each nanoparticle comprising a core and a passivation layer covering the core, the core being made of silicon or an alloy thereof, the method comprising the steps of:
   a. providing a core precursor comprising the silicon or alloy thereof,
   b. providing a plasma reactor comprising an induction plasma torch generating a plasma at a temperature allowing production of a vapor of the silicon or alloy thereof from the core precursor, the plasma torch being in fluid communication with a quenching zone located downstream from the plasma torch, the quenching zone being cooled down by a quenching gas to a temperature allowing condensation of the vapor,
   c. feeding the core precursor into the plasma torch, thereby producing the vapor of the silicon or alloy thereof; and
   d. allowing the vapor to migrate to the quenching zone, thereby cooling the vapor and allowing condensation of the vapor into the core made of the silicon or alloy thereof,
   wherein the quenching gas comprises a passivating gas precursor that reacts with the surface of the core in the quenching zone to produce the passivation layer covering the core, thereby producing said nanoparticles.

2. The method of item 1, wherein the passivating gas precursor is ammonia, nitrogen, methane, or acetylene.

3. The method of item 1 or 2, wherein the passivating gas precursor is ammonia or nitrogen.

4. The method of any one of items 1 to 3, wherein the core precursor is:
   the silicon or alloy thereof in metal form or
   an hydride or chloride of the silicon or alloy thereof.

5. The method of any one of items 1 to 4, wherein the core precursor is in micropowder form or in gaseous form.

6. The method of any one of items 1 to 5, wherein the core precursor is in micropowder form.

7. The method of item 6, wherein the particle size of the core precursor in micropowder form is:
   about 1, about 2, about 5, about 10, about 15, or about 20 μm or more, and/or
   about 100, about 90, about 80, about 70, about 60, or about 50 μm or less.

8. The method of item 6 or 7, wherein the particle size of the core precursor in micropowder form is between about 1 μm and about 100 μm, preferably between about 20 and about 50 μm.

9. The method of any one of items 6 to 8, wherein the size distribution of the core precursor in micropowder form is about $d_{90}/d_{10}<3$, preferably about $2<d_{90}/d_{10}<3$.

10. The method of any one of items 6 to 9, wherein the core precursor in micropowder form is the silicon or alloy thereof in metal form, preferably silicon metal or ferrosilicon, and more preferably silicon metal.

11. The method of any one of items 6 to 10, wherein the core precursor in micropowder form is metallurgical grade silicon metal (MG-Si), or ferrosilicon, preferably metallurgical grade silicon metal (MG-Si).

12. The method of any one of items 1 to 5, wherein the core precursor is in gaseous form.

13. The method of item 12, wherein the core precursor in gaseous form is an hydride or chloride of the silicon or alloy thereof, preferably of an hydride or chloride of silicon.

14. The method of item 12 or 13, wherein the core precursor in gaseous form is silane, trichlorosilane, or silicon tetrachloride, preferably silane.

15. The method of any one of items 1 to 14, wherein the core precursor is at least 90% pure, preferably at least 98% pure, and more preferably at least 99% pure.

16. The method of any one of items 1 to 15, wherein feeding step c) comprises mixing the core precursor with a carrier gas, which transports the core precursor into and through the plasma torch and then transports the vapor of the silicon or alloy thereof to the quenching zone.

17. The method of item 16, wherein the carrier gas is argon.

18. The method of any one of items 1 to 17, wherein the plasma is an Ar/$H_2$ plasma.

19. The method of any one of items 1 to 18, wherein a sheath gas is used in the plasma torch.

20. The method of item 19, wherein the sheath gas is argon or a mixture of argon with either or both of hydrogen and the passivating gas precursor, preferably a mixture of argon and hydrogen.

21. The method of any one of items 1 to 20, wherein the quenching gas is constituted of the passivating gas precursor.

22. The method of any one of items 1 to 20, wherein the quenching gas is a mixture of argon and the passivating gas precursor 23. The method of any one of items 1 to 22, wherein the quenching gas is at room temperature when introduced in the quenching zone.

24. The method of any one of items 1 to 23, further comprising the step of discharging the nanoparticles from the plasma reactor.

25. The method of item 24, further comprising producing of a layer of conductive carbon on the nanoparticles.

26. The method of item 25, wherein the layer of conductive carbon is produced by:
  mixing the nanoparticles with a carbon precursor to form a mixture, and
  pyrolizing the mixture in the absence of oxygen to form a layer of conductive carbon on at least part of the surface of the nanoparticles.

27. The method of 26, wherein the carbon precursor is a polymer or an oligomer with a carbon skeleton, a carbohydrate or carbohydrate polymer, an aromatic hydrocarbon, or a mixture thereof.

28. The method of 27, wherein the carbon precursor is polyethylene, polypropylene, glucose, fructose, sucrose, xylose, sorbose, starch, cellulose or an ester thereof, a block polymer of ethylene and ethylene oxide, a polymer of furfuryl alcohol, or a mixture thereof.

29. The method of item 24, further comprising producing of a composite Si/carbon agglomerate.

30. The method of item 29, wherein the composite Si/carbon agglomerate is produced by:
  mixing the nanoparticles with a carbon precursor to form a mixture, and
  pyrolizing the mixture to form the composite Si/carbon agglomerate.

31. The method of 30, wherein the carbon precursor is poly(acrylic acid) (PAA), carbon black, such as Denka Black, or vapor grown carbon fibers (VGCF), or a mixture thereof.

32. The method of 31, wherein the carbon precursor is a mixture of poly(acrylic acid) (PAA), carbon black, such as Denka Black, and vapor grown carbon fibers (VGCF).

33. The method of any one of items 26 to 32, wherein the mixture comprises between about 0.1 and about 25 wt %, preferably between about 0.3 and about 1.5 wt %, of the carbon precursor based on the total weight of the mixture.

34. The method of any one of items 26 to 33, wherein the mixture further comprises a solvent, preferably water or methanol, more preferably methanol.

35. The method of item 34, wherein the mixture is dried before pyrolysis.

36. The method of any one of items 26 to 35, wherein the pyrolysis is carried out in a reducing atmosphere.

37. The method of any one of items 26 to 36, wherein the pyrolysis is carried out at a temperature between about 500 and about 1100° C., preferably between about 500 and about 800° C.

38. The method of item 24, further comprising activating the surface of the nanoparticles using an aqueous acid solution and then functionalizing the nanoparticles.

39. The method of item 38, wherein the nanoparticles are mixed with the aqueous acid solution and then the functionalizing reagent is added to the mixture.

40. The method of item 38 or 39, wherein the aqueous acid solution is an aqueous 2% HF solution.

41. The method of any one of items 38 to 40, wherein the functionalizing reagent is a trimethoxysilane, preferably trimethoxymethylsilane, trimethoxy(vinyl)silane, or trimethoxyphenylsilane.

42. The method of any one of items 38 to 41, further comprising isolating the functionalized nanoparticles.

43. The method of item 42, wherein the functionalized nanoparticles are isolated by liquid-liquid extraction, preferably using dichloromethane ($CH_2Cl_2$) as an extraction phase.

44. Nanoparticles comprising a core and a passivation layer covering the core, the core being made of silicon or an alloy thereof.

45. The nanoparticles of item 44, being manufactured by the method of any one of items 1 to 24.

46. The nanoparticles of 44 or 45, wherein the passivation layer is:
  a layer of nitride of the silicon or alloy thereof, or
  a layer of amorphous carbon.

47. The nanoparticles of any one of items 44 to 46, wherein the passivation layer is a layer of nitride of the silicon or alloy thereof.

48. The nanoparticles of any one of items 44 to 47, wherein the passivation layer is a layer of $Si_3N_4$.

49. The nanoparticles of any one of items 44 to 48, wherein the passivation layer is at most about 5 nm in thickness, preferably at most about 3 nm in thickness.

50. The nanoparticles of any one of items 44 to 49, wherein the core is made of silicon or ferrosilicon.

51. The nanoparticles of any one of items 44 to 50, wherein the core is made of silicon.

52. The nanoparticles of any one of items 44 to 51, having an average particle size between about 20 nanometers and about 300 nanometers.

53. The nanoparticles of any one of items 44 to 52, having an average particle size of
  about 20, about 30, about 40, about 50, about 60, or about 70 nm or more, and/or
  about 300, about 280, about 260, about 250, about 240, about 220, about 200, about 180, about 160, about 150, about 140, about 120, about 100, about 90, or about 80 nm or less.

54. The nanoparticles of any one of items 44 to 53, having an average particle size between about 60 nm and about 260 nm, preferably between about 70 nm and about 100 nm.

55. The nanoparticles of any one of items 44 to 54, having a mean diameter of less than 200 nm, preferably less than about 100 nm.

56. The nanoparticles of any one of items 44 to 55, having a mean diameter between about 40 nm and about 200 nm, preferably between about 60 nm and about 100 nm.

57. The nanoparticles of any one of items 44 to 56, being substantially spherical in shape.

58. The nanoparticles of any one of items 44 to 57, wherein the nanoparticles are substantially free of $SiO_x$ and SiOH surface species 59. The nanoparticles of any one of items 44 to 57, wherein the nanoparticles further comprise a layer of conductive carbon covering at least part of the surface of the nanoparticles.

60. The nanoparticles of item 39, comprising between about 0.1 and about 10 wt % of conductive carbon, based on the total weight of the nanoparticles 61. The nanoparticles of any one of items 44 to 57, wherein the nanoparticles are comprised within a composite Si/carbon agglomerate.

62. Use of the nanoparticles of any one of items 44 to 58 in the manufacture of an electrode, preferably an anode.

63. An electrode, preferable an anode, comprising a current collector covered with an admixture of the nanoparticles of any one of items 44 to 58, an electron conductor and a binding agent.

64. The electrode of item 63, wherein the electron conductor is graphite, a carbon black, carbon nanotube, carbon fiber, or graphene, preferably acetylene carbon black.

65. The electrode of item 63 or 64, wherein the binding agent is sodium alginate.

66. The electrode of any one of items 63 to 65, wherein the current collector is a meta foil or grid.

BRIEF DESCRIPTION OF THE DRAWINGS

In the appended drawings:

FIGS. 8 (a) to (e) show the element maps for C, N, O, Na, and Si respectively, while FIG. 8(f) shows the corresponding electro image for the nanoparticles produced in Example 1.

FIG. 20(a) is a micrograph of the silicon nanopowder particles as received and FIG. 20(b) is a micrograph of the composite silicon nanopowder/carbon particles of Example 5a.

DETAILED DESCRIPTION OF THE INVENTION

Figure 1:
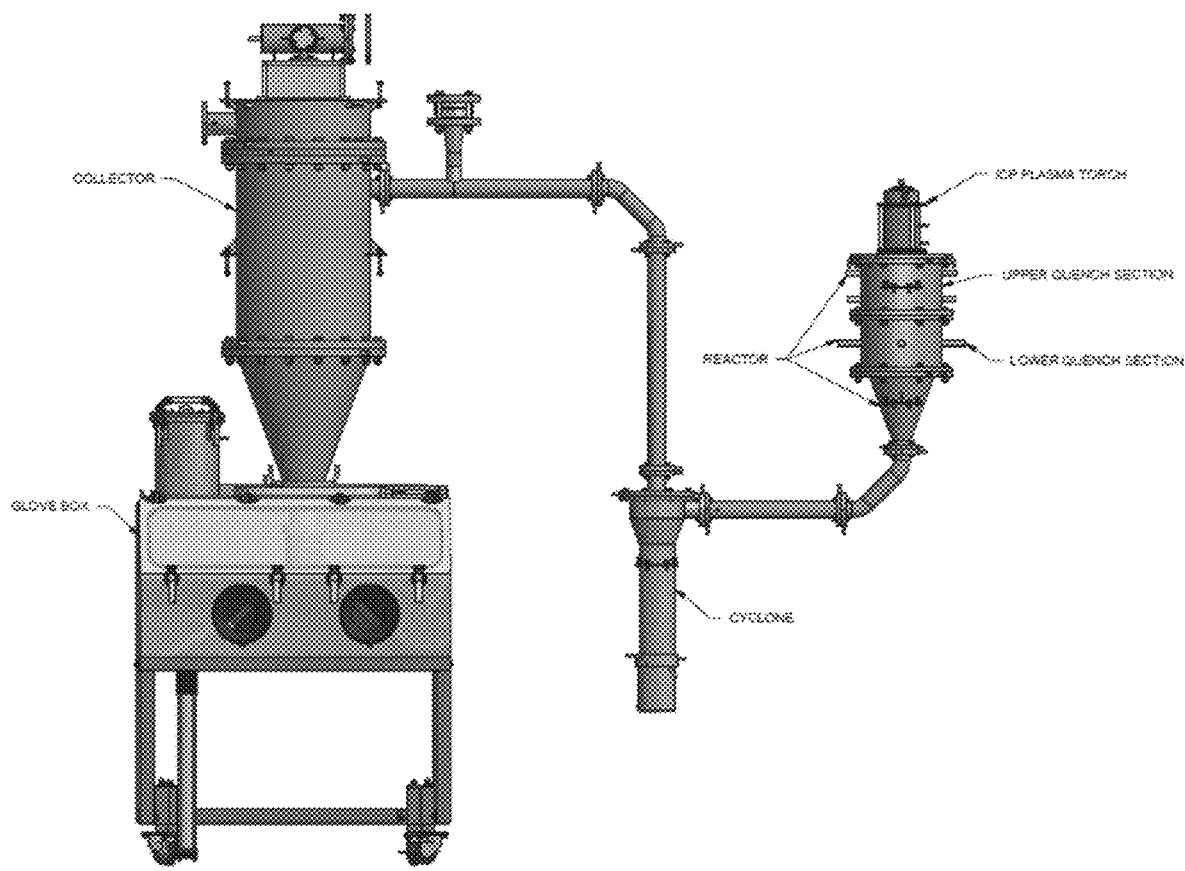
FIG. 1 shows a plasma reactor set-up that implements an induction plasma torch, for synthesizing nanoparticles.

The present invention relates to a method for manufacturing nanoparticles comprising a core and a passivation layer covering the core, the core being made of silicon or an alloy thereof. The invention also relates to the nanoparticles themselves, and the use of said nanoparticles in the fabrication of an anode.

Method of Manufacturing the Nanoparticles

Turning now to the invention in more details, there is provided an improvement on the above known processes using an induction plasma torch for the synthesis of nanoparticles, including those described in U.S. Pat. No. 8,013,269, US 2012/201266A1, U.S. Pat. Nos. 6,994,837, 7,501,599, 8,859,931, and US 2002/155059A1, which are incorporated herein by reference.

Since plasma torches normally use high purity gases for plasma generation, nanoparticles conventionally produced using the above-mentioned technologies are usually desirably free from surface contamination. They have however a surface with very reactive dangling bonds which make them prone to the formation of an undesirable oxide layer.

For example, if a silicon nanopowder is conventionally formed with an inductive plasma torch and then exposed to ambient air, moisture and oxygen will instantaneously react with the silicon surface, thereby producing a $SiO_x$ layer on the silicon surface. There may also be production of silanols (—SiOH) via the following reaction:

$$2Si + 2H_2O = 2SiOH + H_2(g).$$

Due to the highly reactive nature of silicon nanopowder, the nanopowder should be handled with care. Since the oxidation of such nanopowder increases with longer exposure to air, the surface thickness of the electrically insulating $SiO_x$ layer also increases with time. Even worse, if this silicon nanopowder is used directly in the fabrication of a composite electrode (for example for use in a lithium-ion battery) using aqueous media, hydrogen gas will evolve and may dangerously pressurize any closed vessel. This hydrogen production reaction is:

$$Si + 2H_2O \rightarrow SiO_2 + 2H_2$$

Further, the unavoidable insulating $SiO_x$ layer degrades the performances of the silicon anodes by blocking the electrical path of electrons and lithium ions. Also, when lithium ions are reduced by the alloying reaction in the silicon particle, a back-reaction with the oxide layer consumes it in a stable form, thereby lowering the capacity of the electrochemical cell.

Chemical Vapor Deposition (CVD), typically carried out in an atomic layer deposition (ALD) reactor, can be used to deposit a passivation layer on conventional nanoparticles after their production. However, even in such cases, it is still necessary to expose the nanoparticles to air during the transfer of the nanoparticles from the plasma reactor where they are produced to the ALD reactor.

In the method of the present invention, the nanoparticles are covered in situ (i.e. in the plasma reactor before any potential exposition to oxygen/air and moisture/water) with a passivation layer. This passivation layer significantly reduces the reactivity of the produced nanoparticles to oxygen, moisture and water, thereby avoiding, reducing, or retarding the undesirable formation of an oxide layer. Therefore, in embodiments, the nanoparticles of the invention comprise a reduced, and preferably no, oxide layer. More details on the various advantages of the invention will be provided in a separate section below.

More specifically, there is provided a method of manufacturing nanoparticles, each nanoparticle comprising a core and a passivation layer covering the core, the core being made of silicon or an alloy thereof, the method comprising the steps of:

a) providing a core precursor comprising the silicon or alloy thereof, b) providing a plasma reactor comprising an induction plasma torch generating a plasma at a temperature allowing production of a vapor of the silicon or alloy thereof from the core precursor, the plasma torch being in fluid communication with a quenching zone located downstream from the plasma torch, the quenching zone being cooled down by a quenching gas to a temperature allowing condensation of the vapor, c) feeding the core precursor into the plasma torch, thereby producing the vapor of the silicon or alloy thereof; and d) allowing the vapor to migrate to the quenching zone, thereby cooling the vapor and allowing condensation of the vapor into the core made of the silicon or alloy thereof, wherein the quenching gas comprises a passivating gas precursor that reacts with the surface of the core in the quenching zone to produce the passivation layer covering the core, thereby producing said nanoparticles.

The nanoparticles produced by the above method preferably are between about 20 nanometers and about 300 nanometers in average particle size. If the average size of the nanoparticles is larger than 300 nm, the ability to control changes in volume and stresses is undesirably reduced when the nanoparticles are used in the fabrication of an anode. In embodiments of the present invention, the nanoparticles are:

about 20, about 30, about 40, about 50, about 60, or about 70 nm or more, and/or about 300, about 280, about 260, about 250, about 240, about 220, about 200, about 180, about 160, about 150, about 140, about 120, about 100, about 90, or about 80 nm or less in average particle size.

Preferably, the average size of the nanoparticles is between about 60 nm and about 260 nm, and most preferably it is between about 70 nm and about 100 nm. Further, Preferably, the mean diameter of the nanoparticles is preferably less than 200 nm, preferably less than about 100 nm. Preferably, the nanoparticles have a mean diameter between about 40 nm and about 200 nm, and most preferably between about 60 nm and about 100 nm. Of note, the size and particle size distribution (PSD) of the cores are roughly the same as the size and PSD of the nanoparticles, save for a small increase in size for the nanoparticles compared to the cores, due to the formation of the passivation layer.

In embodiments, the nanoparticles particles are substantially spherical in shape.

The core of the nanoparticles of the present invention are made of silicon or an alloy thereof. Silicon and its alloys, when used as anodes, offer improved capacity, and using nanoparticles of silicon improves the cycle performance of the resulting anode by helping control changes in volume and stresses.

The cores are formed by condensation of the vapor of the silicon or alloy thereof. This vapor is produced from the core precursor. In other words, the core precursor comprises the silicon, or alloy thereof. The core precursor is any compound that produces a vapor of the silicon or alloy thereof when fed into an induction plasma torch. In embodiments, the core precursor is the silicon or alloy thereof, in metal form or an hydride or chloride thereof. In preferred embodiments, the core precursor is silicon metal or silane (i.e. a silicon hydride).

In embodiments of the present invention, the core precursor is in micropowder form or in gaseous form.

In embodiments of the present invention, the core precursor is in micropowder form. If the particle size of the micropowder precursor is too large, it may undesirably not be entirely vaporized when fed to the plasma induction torch. Thus, in embodiments, the obtained nanoparticles are mixed with some remaining core precursor. However, if it is too small, the surface area is increased, which increases radiation loss, and therefore energy loss, of the plasma, thereby requiring more energy to carry out the process. Therefore, the particle size of the micropowder precursor is preferably between about 1 μm and about 100 μm. In embodiments of the present invention, the average size of the particles of the micropowder is:

about 1, about 2, about 5, about 10, about 15, or about 20 μm or more, and/or about 100, about 90, about 80, about 70, about 60, or about 50 μm or less.

Preferably, the average size of the micropowder is between about 20 and about 50 μm. In preferred embodiments, the size distribution of the micropowder precursor is about $d_{90}/d_{10} < 3$. In more preferred embodiments, the size distribution of the micropowder precursor is about $2 < d_{90}/d_{10} < 3$. In preferred embodiments, the micropowder precursor is the silicon or alloy thereof in metal form. In more preferred embodiments, the micropowder precursor is silicon metal or ferrosilicon, preferably silicon metal, either provided from a low-cost source or with a higher purity such as that obtained by the Siemens process. In embodiments, the micropowder precursor is metallurgical grade silicon metal (MG-Si), or ferrosilicon. In more preferred embodiments, the micropowder precursor is MG-Si.

In alternative embodiments of the present invention, the core precursor is in gaseous form. In preferred such embodiments, the gaseous core precursor is a hydride or a chloride of the silicon or alloy thereof, preferably of silicon. In more preferred embodiments, the gaseous core precursor is silane (i.e. silicon tetrahydride, $SiH_4$), trichlorosilane ($SiHCl_3$) or silicon tetrachloride ($SiCl_4$). In a most preferred embodiment of the present invention, the core precursor is silane.

With regard to the purity level of the core precursor, there is no requirement for a high degree of purity. However, the chemical composition of the core of the produced nanoparticles will be directly related to the chemical composition of the core precursor. In preferred embodiments, the core precursor is at least 90% pure. In more preferred embodiments, the core precursor is at least 98% pure. In most preferred embodiments, the core precursor is at least 99% pure.

In most preferred embodiments, the cores are made of silicon and the core precursor is metallurgical grade silicon metal (MG-Si) or silane.

The plasma is generated by the plasma torch from a gas as well known in the art. The plasma therefore can include a carrier gas, as well as a central gas. In preferred embodiments, the plasma comprises a mixture of Ar and $H_2$. The plasma further includes the vapor generated from the core precursor.

The feeding step c) of the present invention can generally be carried out as known in the art. Step c) typically involves mixing the core precursor with the carrier gas, which transports the core precursor into and through the induction plasma torch and then transports the resulting vapor to the quenching zone. The carrier gas can be any carrier gas commonly known in the art that will not adversely react with the core precursor. In preferred embodiments of the present invention, the carrier gas comprises argon. The carrier gas may further comprise other gases, such as helium.

The feeding speed will affect the concentration of core precursor in the carrier gas, as well as how quickly the core precursor passes into and through the induction plasma torch. When the core precursor is in solid powder form, if the feeding speed is too fast, some of the core precursor might not be vaporized. However, if it is too slow, the feeding may not be stable over time and the condensation step may not occur properly. The feeding speed should therefore be sufficiently slow to ensure complete vaporization of the core precursor, and should be sufficiently fast to ensure proper condensation of the resulting vapor. Naturally, if the core precursor is in solid powder form, the required feeding speed will depend on the size and size distribution of the core precursor as well as the reactor, including the power of the plasma torch.

The plasma reactor can be any such reactor know in the art, including for example those described in U.S. Pat. No. 8,013,269, US 2012/201266A1, U.S. Pat. Nos. 6,994,837, 7,501,599, 8,859,931, and US 2002/155059A1, which are incorporated herein by reference, as well as those shown in FIG. 1. The reactor contains an induction plasma torch generating a plasma at a temperature allowing the production of a vapor of the silicon or alloy thereof from the core precursor. The plasma torch is in fluid communication with a quenching zone located downstream from the plasma torch. The quenching zone is cooled down by a quenching gas to a temperature allowing condensation of the vapor.

Figure 2:
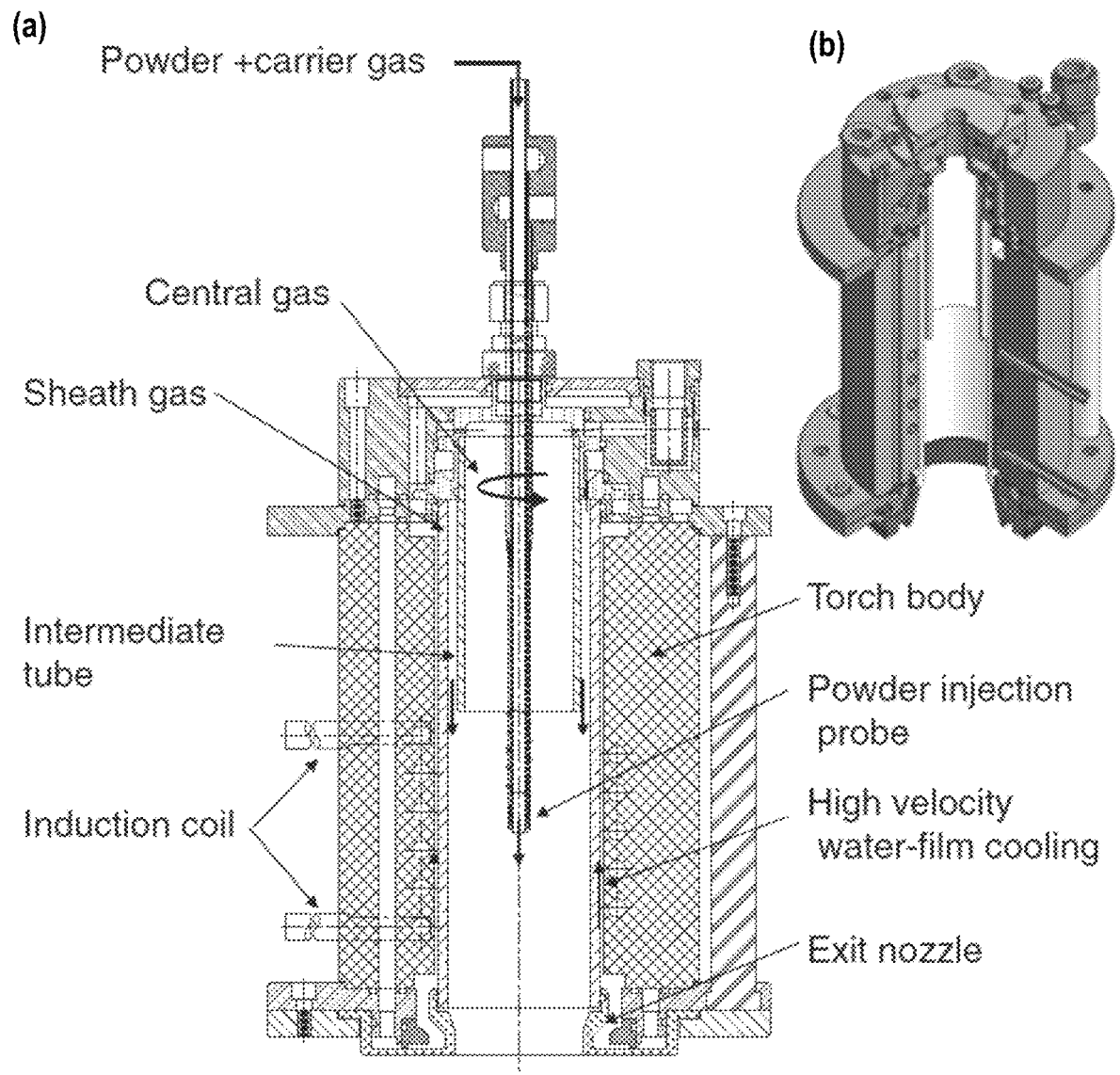
FIG. 2(a) is a cross-sectional view of an induction plasma torch for use in synthesizing nanoparticles.
FIG. 2(b) is a three-quart view of the same induction plasma torch.

The induction plasma torch of the present invention can be any induction plasma torch known in the art that is capable of producing a vapor of the silicon or alloy thereof from the core precursor. In other words, the plasma produced by the torch is at a temperature allowing production of the vapor starting from the core precursor. The vapor production can occur through physical changes (for example evaporation or sublimation of the precursor) and/or chemical changes (for example dissociation or decomposition of the precursor). In preferred embodiments, the induction plasma torch is any one of the induction plasma torches as described in U.S. Pat. Nos. 5,200,595, 9,380,693, 6,693,253, PQ-35 Tekna's Induction plasma torch, PL-35 Tekna's Induction plasma torch, PL-50 Tekna's Induction plasma torch, PL-70 Tekna's Induction plasma torch, PL-100 Tekna's Induction plasma torch, PN-70 Tekna's Induction plasma torch, PN-35 Tekna's Induction plasma torch, or PN-50 Tekna's Induction plasma torch, as well as the torch shown in FIG. 2(a) and FIG. 2(b). In more preferred embodiments, the induction plasma torch is PN-35 Tekna's Induction plasma torch.

In embodiments of the present invention, the plasma torch implements the use of a sheath gas. The sheath gas is a gas that helps stabilize the plasma and protects the plasma confinement tube as a confinement medium. The sheath gas may be any sheath gas known in the art. In embodiments of the present invention, the sheath gas is argon, a mixture of argon and hydrogen, a mixture of argon and the passivating gas precursor, or a mixture of argon, hydrogen, and the passivating gas precursor. In preferred embodiments, the sheath gas is a mixture of argon and hydrogen.

In embodiments, the plasma reactor can further comprise a feeder (for feeding the core precursor into the induction plasma torch), a cyclone collector, and a filter collector, as shown in FIG. 1.

The injection of the quenching gas is performed such that the quenching gas comes into contact with the vapor in the quenching zone during the method of the present invention. The quenching gas cools the quenching zone to a temperature allowing condensation of the vapor. Typically, condensation occurs when the vapor comes into contact with the quenching gas. However, in some circumstances, condensation could begin before the vapor reaches the quenching gas, as the vapor cools while it migrates through the plasma reactor.

The quenching gas can be any quenching gas known in the art, as long as it does not adversely react with the plasma and the vapor, and as long as it contains the passivating gas precursor. In preferred embodiments, the quenching gas can be composed entirely of the passivating gas precursor. In other embodiments of the present invention, the quenching gas is a mixture of a known quenching gas, such as argon, and the passivating gas precursor.

The temperature at which the quenching gas is introduced in the quenching zone will affect the condensation of the vapor, as well as the reaction of the cores with the passivating gas precursor. The temperature at which the quenching gas comes into contact with the vapor will help determine the size and particle size distribution (PSD) of the cores. Specifically, a colder quenching gas will increase the speed at which the vapor condenses, thereby decreasing the particle size and PSD of the cores. Conversely, hotter quenching gas will generally result in increased particle size and PSD. Similarly, a higher temperature will increase the amount of time the cores react with the passivating gas precursor, which will result in a thicker passivation layer, whereas a lower temperature generally results in a thinner passivation layer. Accordingly, the temperature at which the quenching gas is introduced into the plasma flow should be sufficient to produce cores of the desired size and PSD, and to react the cores with the passivating gas precursor for a sufficient amount of time to produce a passivation layer with the desired thickness. The temperature range will naturally depend on the chemical composition of the vapor, specifically the silicon or alloy thereof used. In preferred embodiments of the present invention, the quenching gas is introduced at room temperature.

The passivating gas precursor is a gas that, when reacted with the cores, produces the desired passivation layer on the cores. In preferred embodiments, the passivating gas precursor is ammonia, nitrogen, methane, or acetylene. In more preferred embodiments, the passivating gas precursor is ammonia or nitrogen.

The passivation layer forms on the cores due to the chemical reaction of the passivating gas precursor on the surface of the cores. The passivation layer can be any layer that will protect the cores from reacting with oxygen and other contaminants, while also not undesirably reacting with the nanoparticles once they are formed. As noted above, the composition of the passivation layer will depend on the passivating gas precursor chosen. For example, a passivating gas precursor of ammonia or nitrogen will result in a passivation layer made of a nitride of the silicon or alloy thereof, while a passivating gas precursor of methane or acetylene will result in an amorphous carbon passivation layer. In embodiments of the present invention, the passivation layer is a nitride passivation layer or an amorphous carbon passivation layer. In more preferred embodiments, the passivation layer is a nitride passivation layer, and in more preferred embodiments when the nanoparticles are silicon, the passivation layer is $Si_3N_4$.

In general, a higher concentration of the passivating gas precursor in the quenching gas will result in a thicker passivation layer, as more passivating gas precursor molecules will have the opportunity to react with the cores in a given amount of time, while lower concentrations of passivating gas precursor will generally result in a thinner passivation layer. Accordingly, the concentration of the passivating gas precursor should be tailored to the desired passivation layer thickness.

The condensation of the vapor occurs as the vapor cools down in the quenching zone, thereby forming the cores. As previously mentioned, cooling the vapor more quickly will generally increase the speed at which the vapor is condensed, thereby decreasing the particle size and PSD of the cores (and thus of the nanoparticles). Conversely, reducing the speed at which the vapor cools will generally result in increased particle size and PSD. The cooling speed of the vapor will depend on the temperature of the quenching gas, as previously mentioned, along with any other factor that determines the temperature of the quenching zone, such as for example the original temperature of the vapor.

Exposure of the cores to the passivating gas precursor in the quenching zone results in the passivation layer forming on the cores, where the passivating gas precursor undergoes a reaction on the surface of the cores, thereby producing the desired passivating layer. As noted above, with the method of the present invention, the production of the passivation layer is performed in situ in the plasma reactor. This passivation layer reduces the reactivity of the nanoparticles to oxygen/air and moisture/water, thereby avoiding, reducing or retarding the formation of an oxide layer.

The reaction of the cores with the passivating gas precursor occurs when the cores are in contact with the passivating gas precursor at a temperature within a temperature range allowing the reaction. This temperature range will naturally depend on the nature of both the cores and the passivating gas precursor. In addition, it goes without saying that the lower end of this temperature range must be lower than the temperature at which the vapor condenses and the cores form, otherwise the cores will not be formed at the temperature at which the reaction need to occur. For example, when the nanoparticles are silicon, and the passivating gas precursor is $N_2$, the reaction temperature must be less than about 3265° C. (the vaporization point of silicon), while remaining above the minimum temperature for Si and $N_2$ to react during the available residence time.

The thickness of the passivation layer will depend on many factors, but is ultimately determined by the extent of the reaction of the passivating gas precursor on the surface of the cores. When the reaction occurs to a larger extent, a thicker passivation layer will generally result, and vice versa. In the method of the present invention, the following factors tend of increase the thickness of the passivation layer:

Increasing the time spent by the cores in said part of the quenching zone where the temperature is low enough for vapor condensation to occur, but high enough for the reaction between the nanoparticles and the passivating gas precursor to occur. This can be increased by:

increasing the volume of this part of the quenching zone.

decreasing the rate of core migration in said part of the quenching zone (which depend on central gas flow rate and powder carrier flow rate).

Increasing the concentration of the cores in the quenching zone.

Increasing the concentration of the passivating gas precursor in the quenching zone.

Increasing the temperature of the passivating gas precursor.

Providing auxiliary heating, as described in U.S. Pat. No. 9,516,734, which is incorporated herein by reference, to increase residence time.

In order to preserve the conducting properties of the layer for electrons and ions, the thickness of the passivation layer is preferably at most about 5 nm, preferably at most about 3 nanometers. Therefore, the above factors may be adjusted, as well known to the skilled person, in order to produce such a passivation layer, given the composition of the nanoparticles and the passivating gas precursor.

The following settings of the plasma torch may also be adjusted to provide an ideal environment for the feeding, condensation, and reacting steps: plate power, sheath gas flow rate, presence of a probe, the probe sheath gas flow rate, and reactor pressure.

Preferably, when the core precursor is MG-Si, the method can be carried out under the following conditions:

Plasma torch: PN-35 torch $Ar/H_2$ plasma

Plate power: 50 kW

Sheath gas flow rate: (10 slpm $H_2$+70 slpm Ar)

Central gas flow rate: 20 slpm Ar

SG953/260 probe

Probe sheath gas flow rate: 10 slpm Ar

Powder carrier flow rate: 6 slpm Ar

Reactor pressure: 15 psia

Quench gas flows:
Q1=300 lpm $N_2$ in Lower quench section
Q2=700 lpm recycled gas in upper quench section.

Further Modifications of the Nanoparticles—Conductive Carbon Layer

In an additional embodiment of the present invention, the above-described method further comprises, after the production of the nanoparticles and their discharge from the plasma reactor, the following steps leading to the production of a layer of conductive carbon on the nanoparticles:
a) mixing the nanoparticles with a carbon precursor to form a mixture, and
b) pyrolizing the mixture to form a layer of conductive carbon on at least part of the surface of the nanoparticles.

The step of mixing can be performed in any manner, as long as the nanoparticles and the carbon precursor become sufficiently mixed. This can be done, for instance, with a mechanical mixer such as a high energy mixer (SPEX) or a high shear mixer (Agglomaster, Hosokawa), or even by hand; so long as the mixing causes no chemical reactions with either the nanoparticles or the carbon precursor.

The extent of coverage of the layer of conductive carbon, as well as the thickness of the layer, will depend on the nanoparticles:carbon precursor weight ratio of the mixture. The thickness of the conductive carbon layer will also depend on how evenly mixed the mixture is.

The carbon precursor is any organic compound that will not undesirably react with the nanoparticles and that will form a conductive carbon layer when pyrolyzed. The carbon precursor is selected in such a way that the particles of material obtained after the pyrolysis step essentially have the form and granulometric distribution of the nanoparticles. The carbon precursor is chosen in such a way as to leave a deposit of carbon conductor on the surface (layer) of the nanoparticles and/or between the nanoparticles, making up carbon bridges (cross-linking) at the time of pyrolysis. In preferred embodiments, the carbon precursor is a polymer or an oligomer with a carbon skeleton, a carbohydrate (such as sugars) or carbohydrate polymer, an aromatic hydrocarbon, or mixtures thereof.

In more preferred embodiments, the carbon precursor is polyethylene, polypropylene, glucose, fructose, sucrose, xylose, sorbose, starch, cellulose or esters thereof, block polymers of ethylene and ethylene oxide, polymers of furfuryl alcohol, or mixtures thereof.

In preferred embodiments, the amount of the carbon precursor present in the mixture is preferably between about 0.1 and about 25 wt %, and more preferably between about 0.3 and about 1.5 wt %, based on the total weight of the mixture.

In preferred embodiments, the carbon precursor is chosen such that it is easily dispersible at the time of mixture with the nanoparticles. The intimate and/or homogeneous mixture is preferably produced by agitation and/or by mechanical grinding and/or by ultrasonic homogenizing, in the presence, or not, of a solvent or by spray-drying of a solution of one or more precursors and/or of a suspension and/or of an emulsion. The solvent is a low boiling point liquid such as hexane, toluene, isopropanol, acetone that dissolve the carbon precursor without reacting with silicon.

Accordingly, in a preferred embodiment the method of the present invention, the mixing further comprises intimate grinding dry or in a solvent, of the nanoparticles and the carbon precursor, and drying if necessary; and the pyrolysis comprises thermal processing with scavenging by a controlled reducing atmosphere.

During the mixing step a), the mixture may further comprise a solvent. The solvent is any solvent known in the art that will not adversely react with the nanoparticles or the carbon precursor. In embodiments, the solvent is water or methanol. In preferred embodiments, the solvent is methanol.

In embodiments, the mixture is dried before the pyrolysis step. This step may be used to evaporate the solvent, if the solvent is used. In preferred embodiments of the present invention, the mixture is dried using a spay dryer, such as a Mini spray dryer, Büuchi, model B-290.

The pyrolizing step involves heating the mixture in the absence of oxygen (or any halogen) such that the carbon precursor decomposes, thereby leaving the conductive carbon layer on the nanoparticles. This step can be performed using any pyrolysis technique known in the art. The temperature needed for pyrolysis to occur will depend on the carbon precursor chosen. In preferred embodiments of the present invention, the carbon precursor is pyrolized using a tube furnace in inert atmosphere ($N_2$).

In preferred embodiments, the pyrolysis is carried out by heating from normal temperature to a temperature between about 500 and about 1100° C., in the presence of a reducing atmosphere. In more preferred embodiments, the temperature is between about 500 and about 800° C.

In preferred embodiments, the amount of conductive carbon after pyrolysis is between about 0.1 and about 10 wt %, based on the total weight of the nanoparticles.

The conductive carbon layer forms on the nanoparticles when the carbon precursor decomposes. Naturally, the exact composition of the conductive carbon layer will depend on the composition of the carbon precursor.

Further Modifications of the Nanoparticles—Formation of a Si/Carbon agglomerate In an additional embodiment of the present invention, the above-described method further comprises, after the production of the nanoparticles and their discharge from the plasma reactor, the following steps leading to the production of a composite Si/carbon agglomerate.
a) mixing the nanoparticles with a carbon precursor to form a mixture, and
b) pyrolizing the mixture to form the composite Si/carbon agglomerate.

These two steps are as defined in the previous section, except that, in preferred embodiments, the carbon precursor is poly(acrylic acid) (PAA), carbon black, such as Denka Black, or vapor grown carbon fibers (VGCF), or any mixture thereof. In more preferred embodiments, the carbon precursor is a mixture of poly(acrylic acid) (PAA), carbon black, such as Denka Black, and vapor grown carbon fibers (VGCF).

Further Modifications of the Nanoparticles—Functionalization

In an additional embodiment of the present invention, the above described method further comprises the step of functionalizing the nanoparticles. This step of functionalization can be performed using any known technique in the art depending on the nanoparticle components.

In embodiments, the nanoparticles are functionalized by first activating them with an aqueous acid solution and then functionalization them, for example by reacting them with an functionalizing reagent. Both the activation and functionalization can be carried out by mixing the nanoparticles with the aqueous acid solution and then adding the functionalizing reagent. This mixing is performed using any known technique in the art, and is performed for sufficient time, and at sufficient temperature, to allow the activation and subsequent functionalization of the nanoparticles. In embodiments of the present invention, the mixing is performed using a magnetic stir rod.

In embodiments of the present invention, the nanoparticles can first be mixed in the acid solution, and then mixed with the functionalizing reagent. The acid solution is any acid solution that will render the nanoparticles reactive to the additional compound such that a desired functional group is introduced to the surface of the nanoparticles. In embodiments of the present invention, the acid solution is an aqueous 2% HF solution.

The additional compound will determine the functional group introduced on the surface of the nanoparticles. Accordingly, the additional compound is chosen based on the desired functional group. The functional group can be chosen so that it further protects the nanoparticles from moisture, air oxidation, water decomposition ($H_2$ evolution), while lowering reactivity with the electrolyte in the lithium-ion cell or being used as an adhesion promoter with the binder. In a preferred embodiment, the functional group is a silane layer. In embodiments, the additional compound is trimethoxysilane, including trimethoxymethylsilane, trimethoxy(vinyl)silane, and trimethoxyphenylsilane.

In preferred embodiments of the present invention, the method can further comprise isolating the functionalized nanoparticles from the aqueous reaction mixture by liquid-liquid extraction. In embodiments, the extraction is performed using dichloromethane ($CH_2Cl_2$) as an extraction phase. In further embodiments, the separation of the extraction phase from the aqueous phase is performed using centrifugation. In further embodiments, the aqueous phase containing the acid is separated from the dichloromethane phase containing the nanoparticles and optionally the dichloromethane phase is then washed with water to remove any traces of acid. In additional embodiments, the dichloromethane phase, containing a suspension of the nanoparticles, is then dried, for example using a spay dryer.

Nanoparticles

In another aspect, the present invention provides nanoparticles comprising a core and a passivation layer covering the core, the core being made of silicon or an alloy thereof.

The nanoparticles comprise cores made of silicon or an alloy thereof, that are covered with a passivation layer. In embodiments, the nanoparticles are substantially free of $SiO_x$ and SiOH surface species.

In embodiments, the nanoparticles particles are substantially spherical in shape.

The nanoparticles, the core, the silicon and alloy thereof, and the passivation layer are all as described in the previous section. For the sake of certainty, these elements are nevertheless discussed again below.

We noted above that the core of the nanoparticles of the present invention comprises silicon or an alloy thereof. In fact, while the core preferably comprises silicon or an alloy thereof, the method of the invention can be used to produce nanoparticles with a core that can be made of any Group IVa element or alloy thereof.

In preferred embodiments of the present invention, the core of the nanoparticles is made of silicon.

The passivation layer covers the cores of the nanoparticles and reduces their reactivity to oxygen/air and moisture/water. The passivation layer can be any layer that will prevent the nanoparticles from reacting with oxygen/air and moisture/water, while also not inhibiting their performance when used as an anode. In embodiments, the passivation layer is a nitride of the silicon or alloy thereof or an amorphous carbon layer. In preferred embodiments of the present invention, the passivation layer is a nitride of the silicon or alloy thereof. In preferred embodiments, the passivation layer is $Si_3N_4$.

In preferred embodiments, the passivation layer is at most about 3 nanometers in thickness.

In preferred embodiments, the average size of the nanoparticles is between about 20 nanometers and about 300 nanometers. In embodiments of the present invention, the nanoparticles are:

- about 20, about 30, about 40, about 50, about 60, or about 70 nm or more, and/or
- about 300, about 280, about 260, about 250, about 240, about 220, about 200, about 180, about 160, about 150, about 140, about 120, about 100, about 90, or about 80 nm or less in average particle size.

Preferably, the average size of the nanoparticles is between about 60 nm and about 260 nm, and most preferably it is between about 70 nm and about 100 nm. Further, Preferably, the mean diameter of the nanoparticles is preferably less than 200 nm, preferably less than about 100 nm. Preferably, the nanoparticles have a mean diameter between about 40 nm and about 200 nm, and most preferably between about 60 nm and about 100 nm.

In preferred embodiments, the nanoparticles have been manufactured using the method described in the previous section.

Use of the Nanoparticles

In embodiments of the invention, the nanoparticles are used in the fabrication of electrodes, most preferable of an anode. Indeed, the small size of the nanoparticles allows for an improved cycle performance when they are used in an anode. The size reduction helps control changes in volume and stresses in the nanoparticles.

The anode can be fabricated using any known method of making an anode from a nanopowder, taking into account the composition of the nanoparticles (including the passivation layer and the cores). In further embodiments, said anode is for an electrochemical cell or electrochemical storage energy apparatus, including in preferred embodiments lithium-ion secondary batteries.

In embodiments, the anode is fabricated by mixing the nanoparticles with an electron conductor, a binding agent, and a solvent to form a slurry. The slurry can then be spread across a current collector, where the solvent is evaporated, leaving the desired electrode.

In embodiments of the present invention, the electron conductor is graphite, carbon black, carbon nanotube, carbon fiber, or graphene. In preferred embodiments, the electron conductor is acetylene carbon black, such as Denka Black.

In embodiments, the binding agent is an insulating or conducting polymer that binds the nanoparticles to each other and to a substrate. In preferred embodiments of the present invention, the binding agent is sodium alginate.

The solvent is any solvent known in the art that will not adversely react with the nanoparticles, the binding agent, and the electron conductor. In preferred embodiments, the solvent is water.

In preferred embodiments, the nanoparticles, the acetylene carbon black (Denka Black), and the sodium alginate are mixed in a volume ratio of about 50:25:25, using water as a solvent to achieve a viscosity of about 8500 cP.

The nanoparticles, the electron conductor, the binding agent, and the solvent can be mixed using any method known in the art. In preferred embodiments, they are mixed with a high-energy mixer, such as SPEX Certiprep.

The current collector is any current collector known that will not adversely react with the slurry. In embodiments, the current collector is thin metal foils or grids. In preferred embodiments, the current collector is copper foil.

In preferred embodiments, the slurry is coated on the current collector to achieve loadings of approximately 0.6 mg/cm$^2$.

The step of evaporating the solvent can be performed using any known method in the art. In embodiments, the electrode is dried in a convection oven, under a mild vacuum, or using a combination thereof. In preferred embodiments, the electrode is subsequently pre-dried at 75° C. in a convection oven and then dried at 110° C. under mild vacuum for 12 h.

Advantages of the Invention

In embodiments, the present invention has one or more of the following advantages.

The in-situ application of a stable passivation layer, such as amorphous carbon or nitrides, reduces the reactivity of the produced nanoparticles with oxygen/air, moisture/water and the electrolyte of the lithium-ion cell. The passivation layer prevents, reduces, or retards the formation of an undesirable oxide layer at the surface of the nanoparticles. Oxide layers are highly undesirable since high levels of oxygen have a negative impact on the electrochemical performances of anodes used in lithium-ion battery applications. Accordingly, since the nanoparticles of the present invention are substantially free of SiO$_x$ species and are less prone to oxide layer formation, the performance of the anode fabricated using said nanoparticles is improved. In addition, the thinness of the passivation layer helps preserve the conducting properties of the layer for electrons and ions.

The present invention provides for a simple method for fabricating nanoparticles with a passivating layer. By forming the passivation layer in situ in the plasma reactor, all the steps are desirably combined in one simple operation. Also, the formation of an undesirable surface oxide layer is avoided, reduced, or retarded, preferably avoided, and oxygen levels are thereby reduced. As the formation of the passivation layer occurs inside the plasma reactor, when compared to a separate process carried after nanoparticle production, there is a much lower chance of the nanoparticles of the invention being exposed to air before being adequately protected. Consequently, the nanoparticles synthesis process is simplified, safety of the process is improved, sources of contamination are removed, and the costs of the process are lowered.

When used in the fabrication of an anode, the nanoparticles of the present invention provide for improved cycle performance, as well as improved battery performance due to a reduction of irreversible capacity. Specifically, the small size of the particles helps to control the volume change and stresses they experience, while the reduction of oxygen present in the nanoparticles helps avoid a high irreversible capacity by preventing the reduction of the oxygen by lithium.

In addition, by further coating the nanoparticles with a conductive carbon layer, an electrical pathway is maintained even when there is volume change. Accordingly, this helps avoiding losing contact with the current collector.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illustrate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 3:
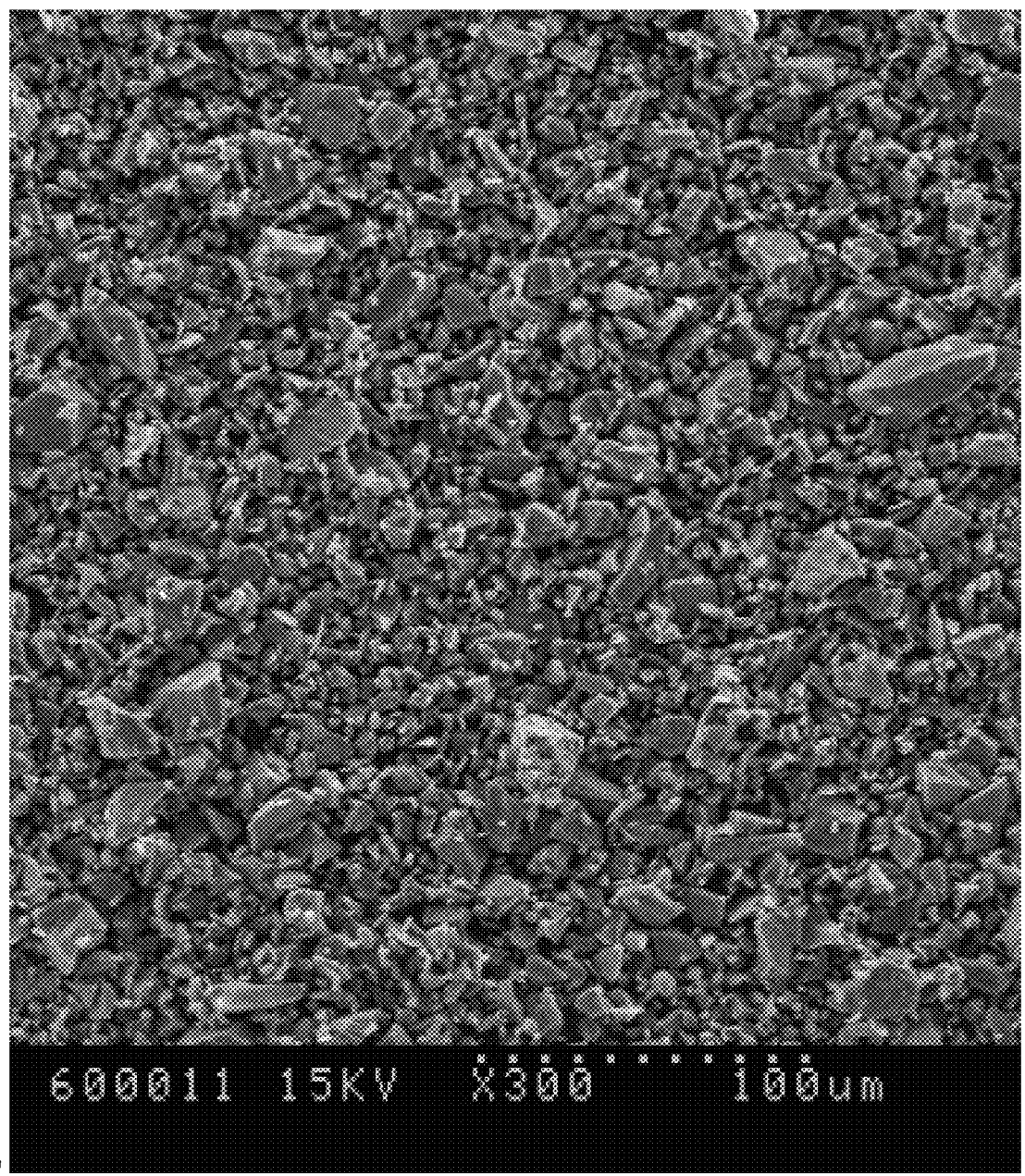
FIG. 3(a) is a SEM micrograph of microparticles used as core precursor, in this case silicon metal powder, for use in synthesizing nanoparticles.
FIG. 3(b) shows an XRD diffractogram of the silicon metal powder.
FIG. 3(c) shows the particle size distribution of the silicon metal powder.
Figure 3:
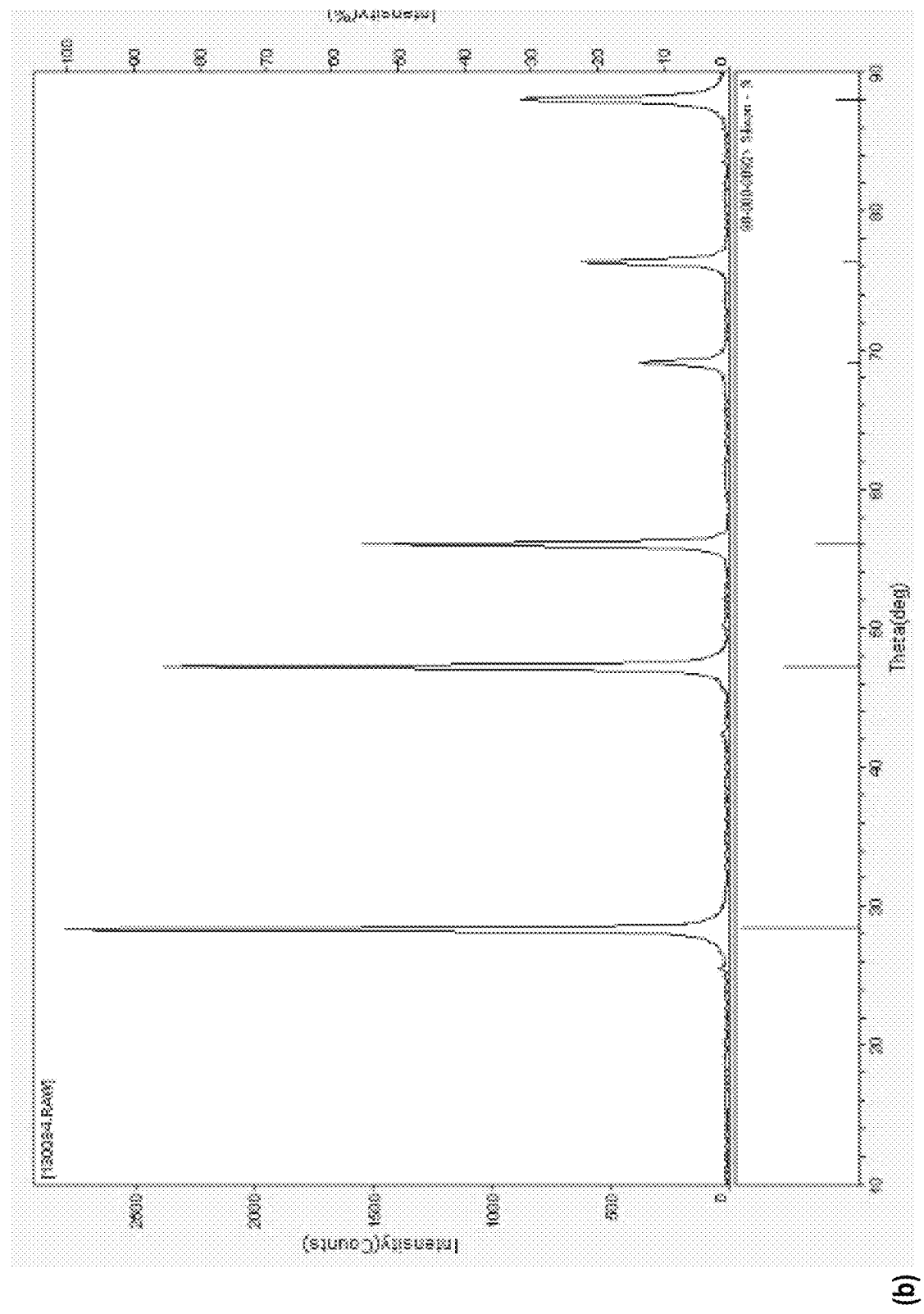
Figure 3:
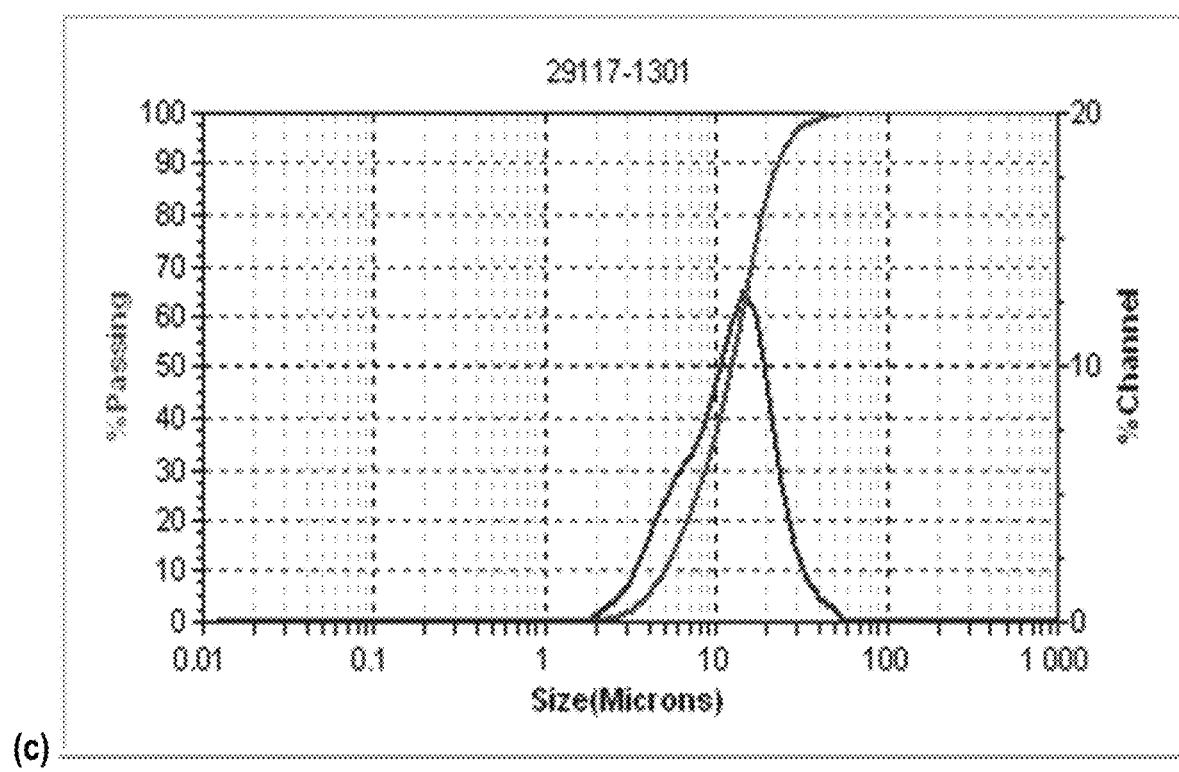

Example 1—Nanoparticles According to the Invention Obtained Using a Silicon Metal Powder A silicon metal powder was used in this experiment as the core precursor. Specifically, SI-102 silicon metal powder (from Atlantic Equipment Engineers) was used. A SEM micrograph of the powder is shown in FIG. 3(*a*). Its X-ray diffraction pattern is shown in FIG. 3(*b*). The particle size distribution of this metal powder is shown in FIG. 3(c), which shows an average particle size of around 10 microns. The silicon metal powder contained about a 0.207% $O_2$ impurity.

Figure 4:
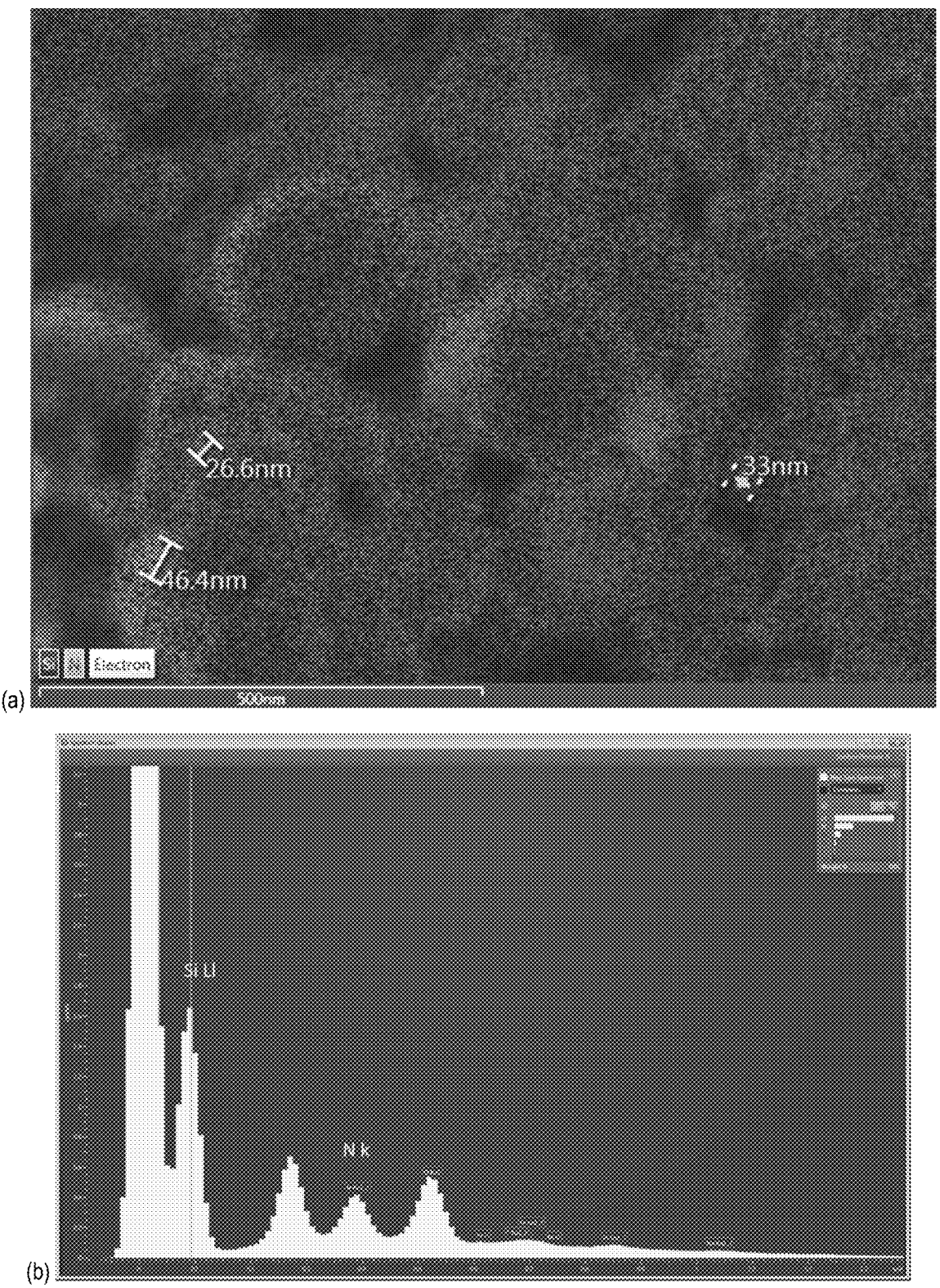
FIG. 4(a) is a SEM/EDX (TESCAN) micrograph showing the nanoparticles of Example 1.
FIG. 4(b) shows the Si and N element mapping for these nanoparticles.
Figure 5:
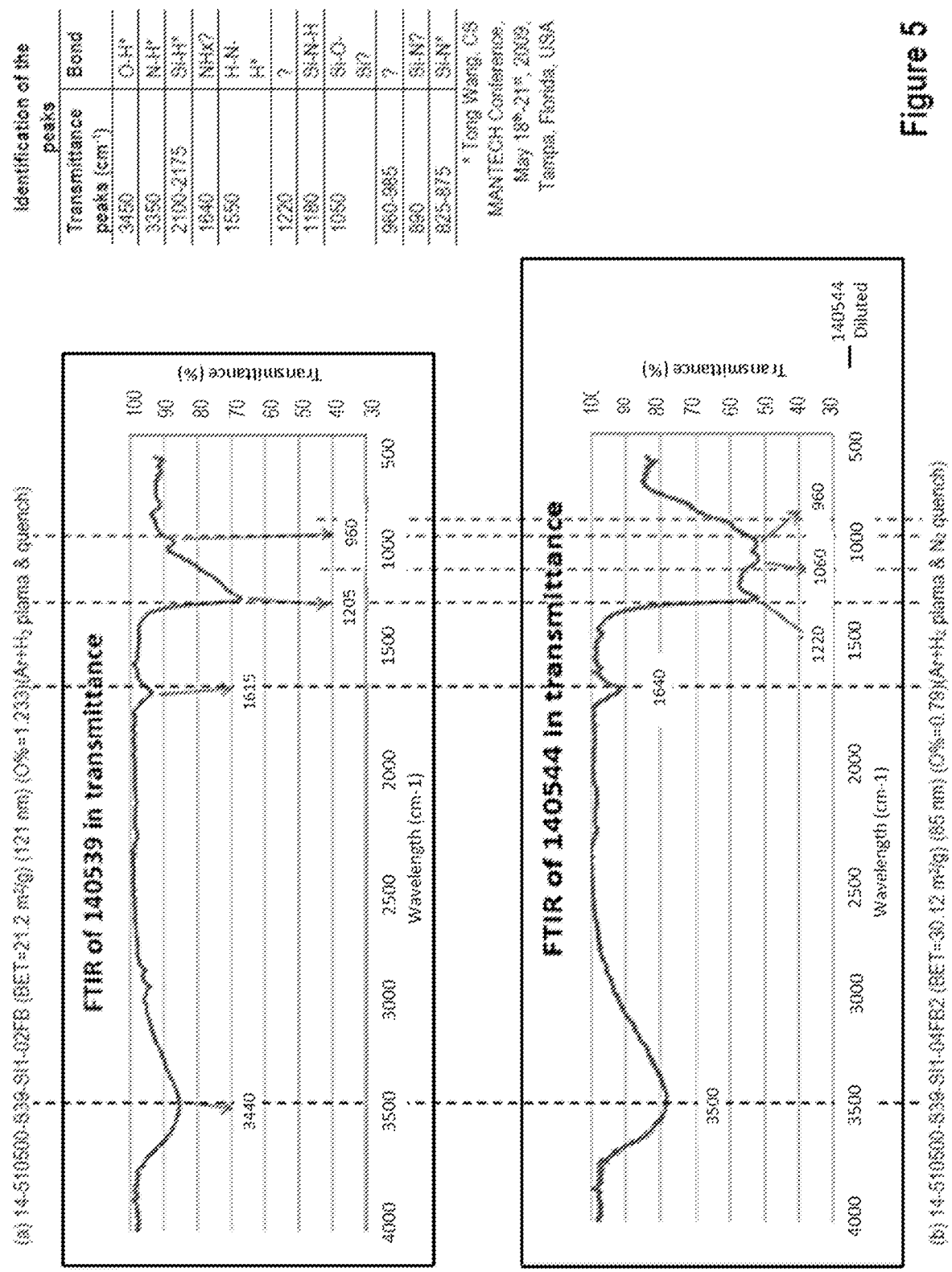
FIGS. 5(a) and 5(b) show the FT-IR spectra of the nanoparticles of Example 2 and Example 1, respectively.
Figure 6:
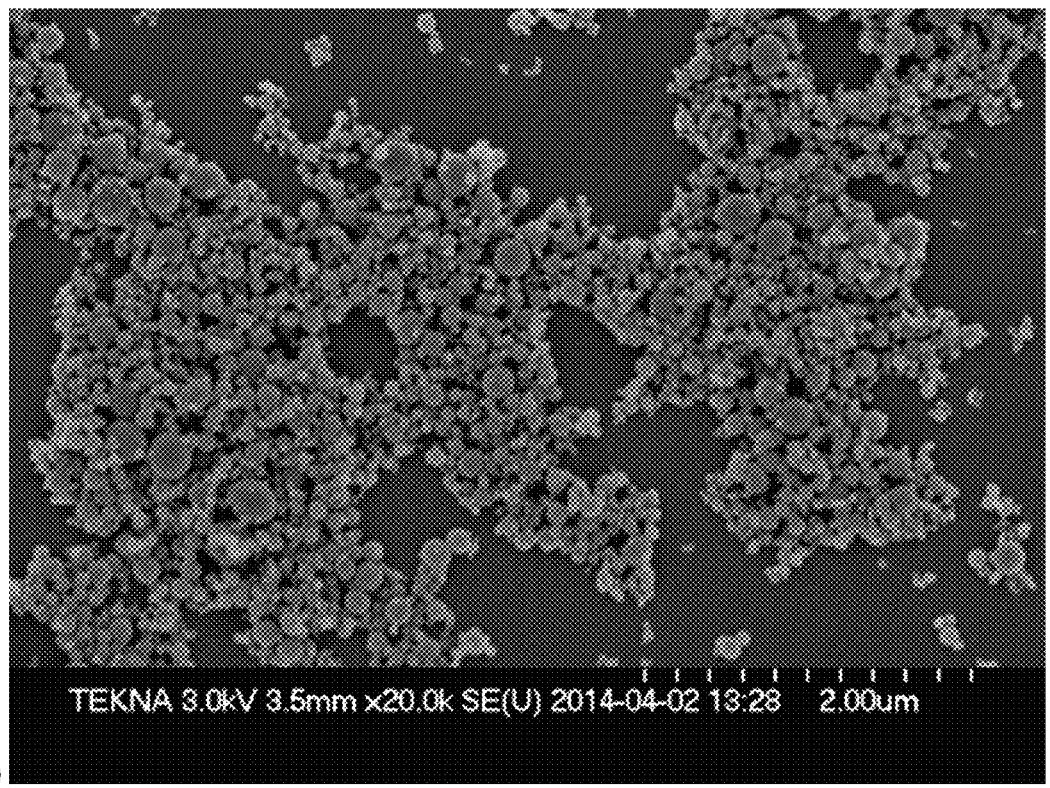
FIGS. 6(a) and 6(b) are SEM micrographs of the nanoparticles of Example 1 at different magnifications.
Figure 6:
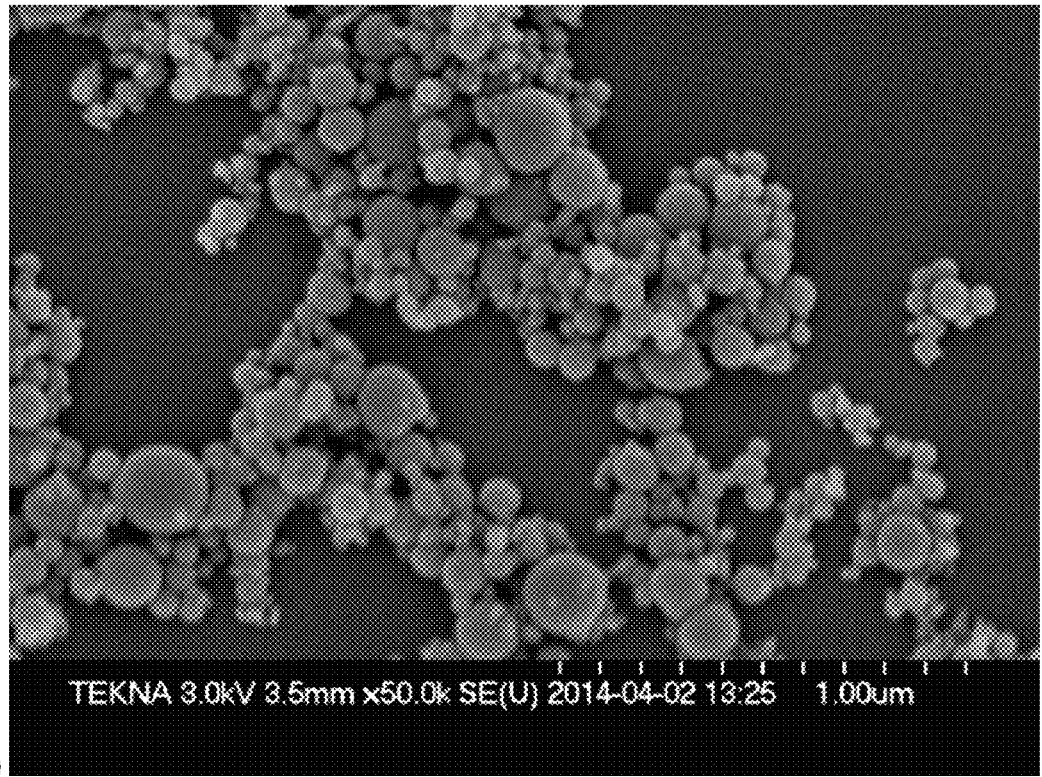
Figure 7:
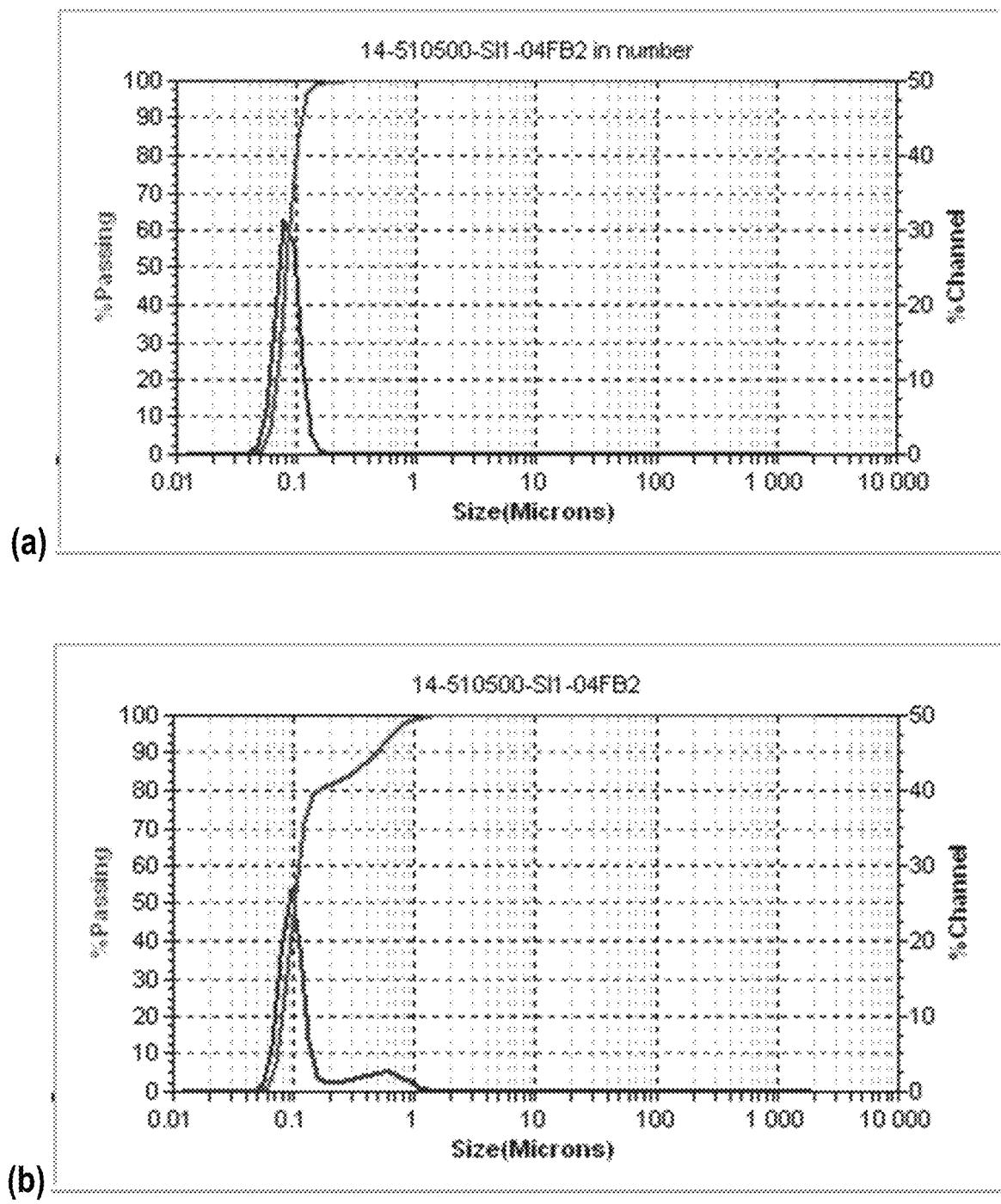
FIGS. 7(a) and 7(b) show the particle size distribution (in number and in volume, respectively) of the nanoparticles of Example 1 (silicon nanoparticles with a nitride passivation layer, synthesized using a nitrogen as quenching gas).

The metal powder was injected into an inductive plasma torch, the set-up for which is depicted in FIG. 1. The operating conditions for the synthesis of the inductive plasma torch were as follows:
Plasma torch: PN-35 torch
Ar/$H_2$ plasma
Plate power: 50 kW
Sheath gas flow rate: (10 slpm $H_2$+70 slpm Ar)
Central gas flow rate: 20 slpm Ar
SG953/260 probe (1 cm below coil center)
Probe sheath gas flow rate: 10 slpm Ar
Powder carrier flow rate: 6 slpm Ar
Reactor pressure: 15 psia
Quench gas flows:
Q1=300 lpm $N_2$ in the lower quench section
Q2=700 lpm recycled gas in the upper quench section The above experiment produced silicon nanoparticles with a silicon nitride ($Si_3N_4$) passivation layer, as shown in FIGS. 4(a) and (b). This layer appears as paler areas in the micrograph shown in FIG. 4(a). The presence of the passivation layer is also demonstrated by the presence of nitrogen measured in the resulting particles (N %=4.6%)—see FIG. 4(b). These nanoparticles contained very little oxygen (O %=0.79%), as can be seen in FIG. 5(b), meaning very little $SiO_x$ formed on the surface of the nanoparticles. FIG. 6(a) and FIG. 6(b) are both micrographs showing the nanoparticles produced, while FIG. 7(a) and FIG. 7(b) show the particle size distribution of the nanoparticles produced, in number and in volume, respectively.

Figure 8:
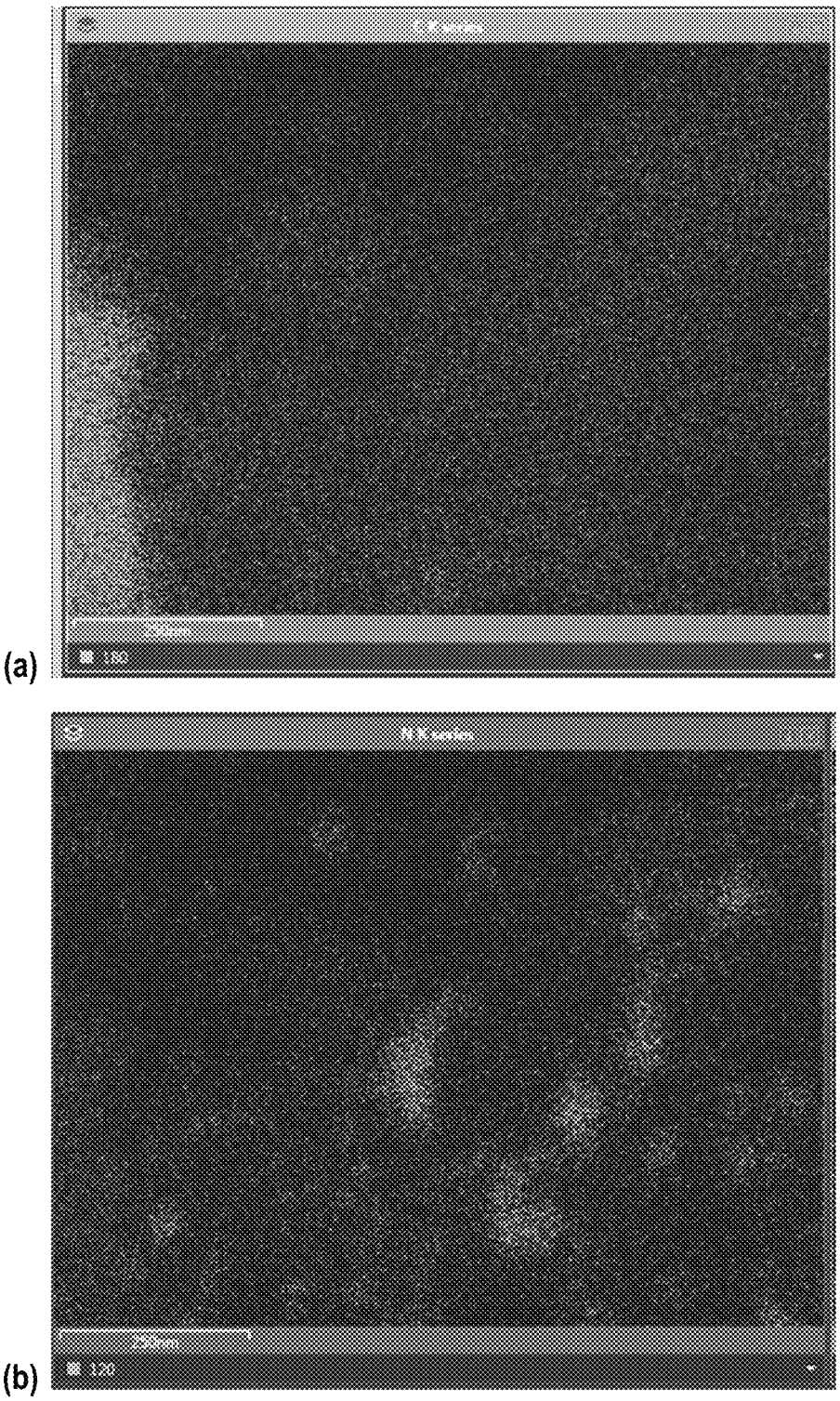
Figure 8:
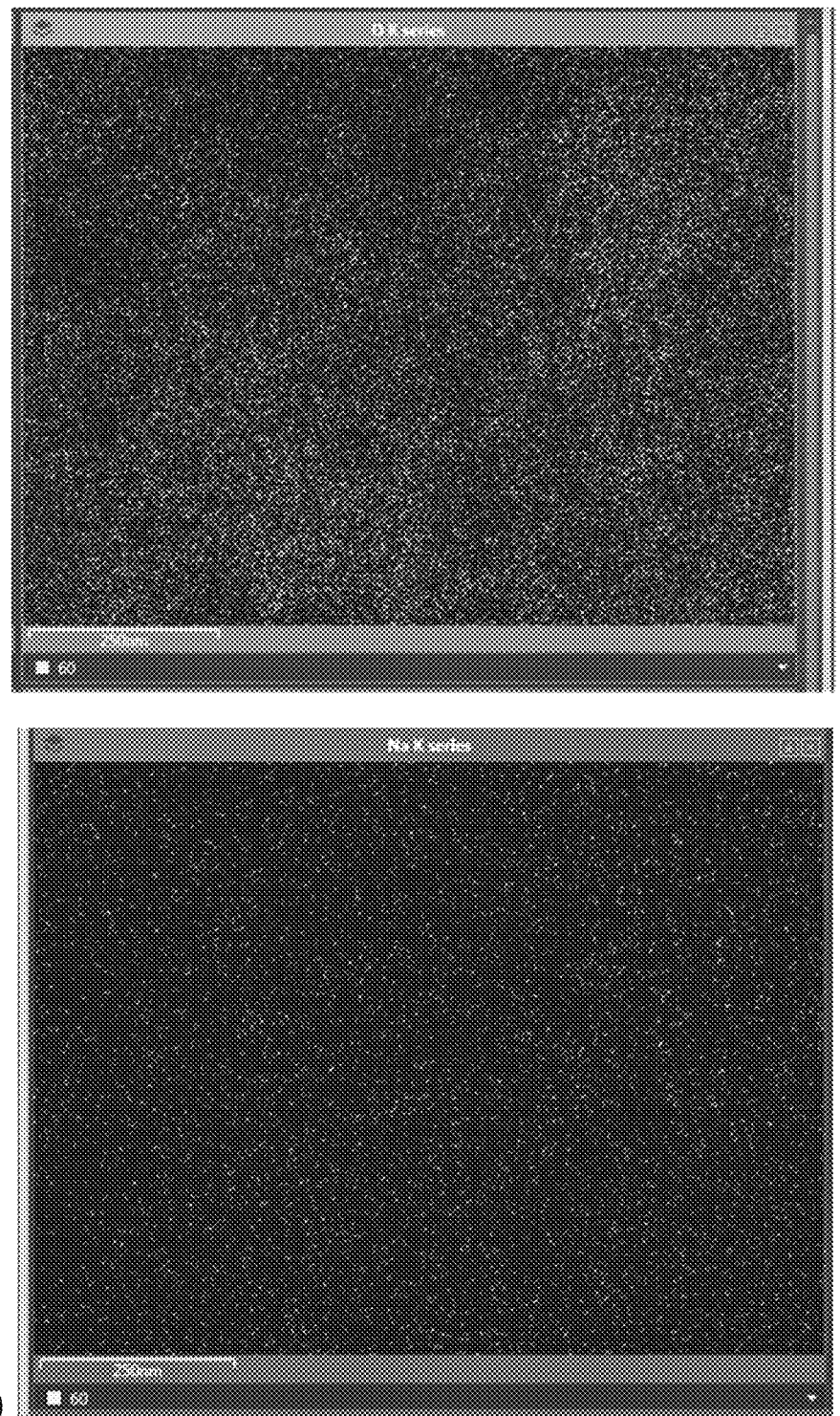
Figure 8:
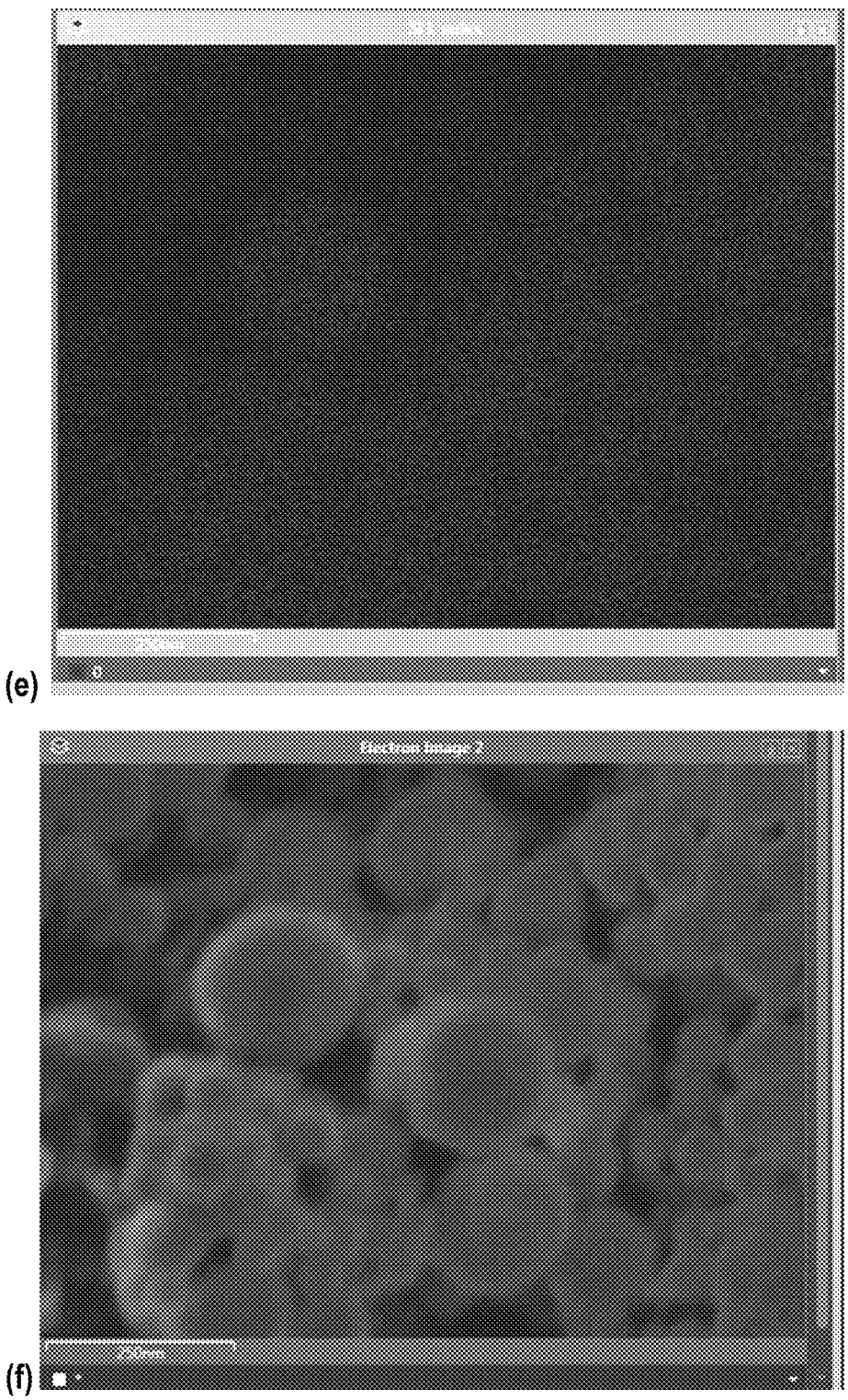

FIGS. 8 (a) to (e) shows the elements maps and corresponding electron image (FIG. 8(f)) measured for the produced nanoparticles. These results also show that presence of the silicon nitride ($Si_3N_4$) passivation layer.

Figure 9:
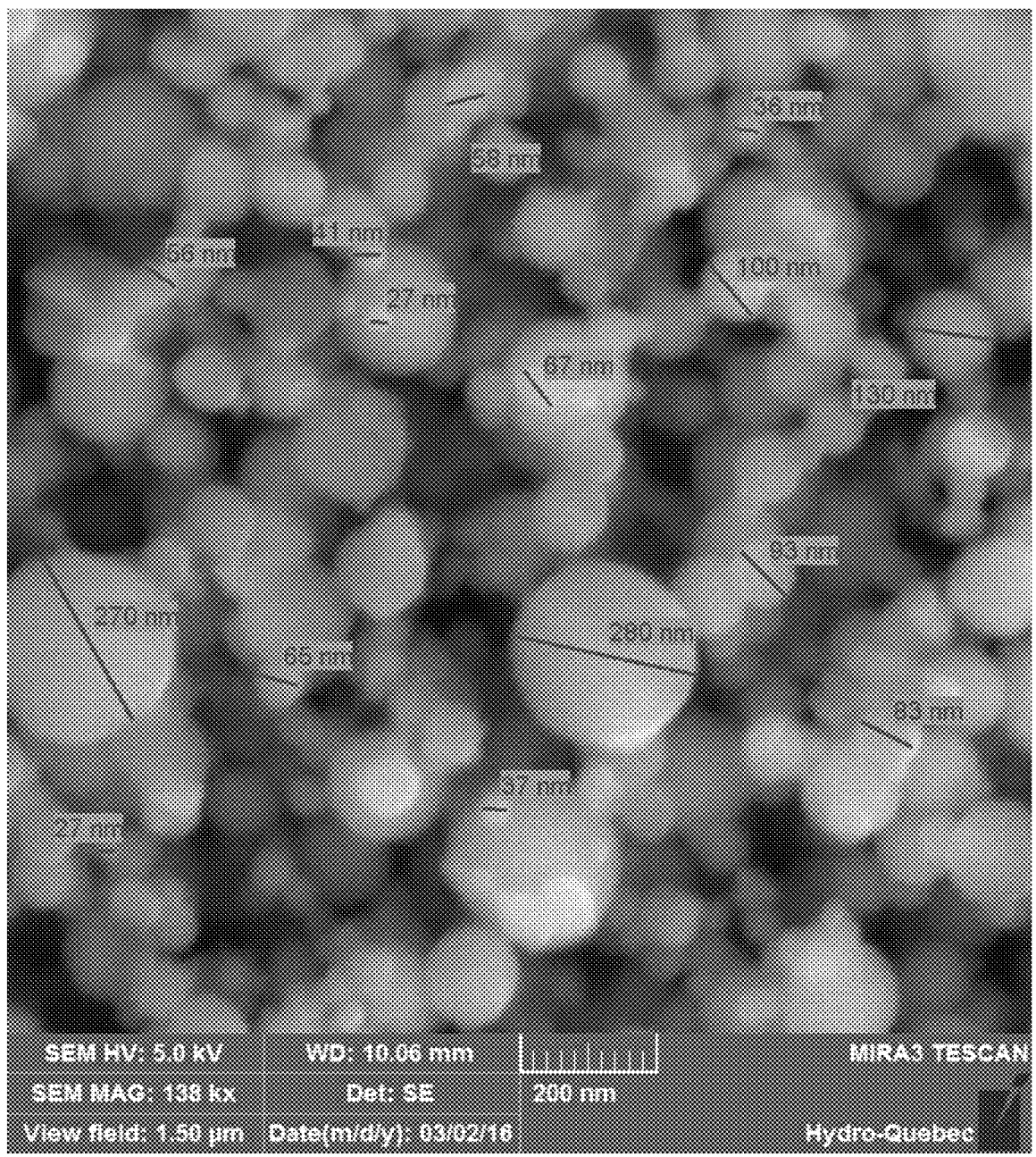
FIG. 9 is a micrograph showing the nanoparticles produced in Example 1.

FIG. 9 shows that these nanoparticles were spherical in shape and between 20 and 300 nm in diameter. The average size of the particles was very small (around 85 nm), which further make the nanoparticles ideal for use in the fabrication of an anode.

Figure 10:
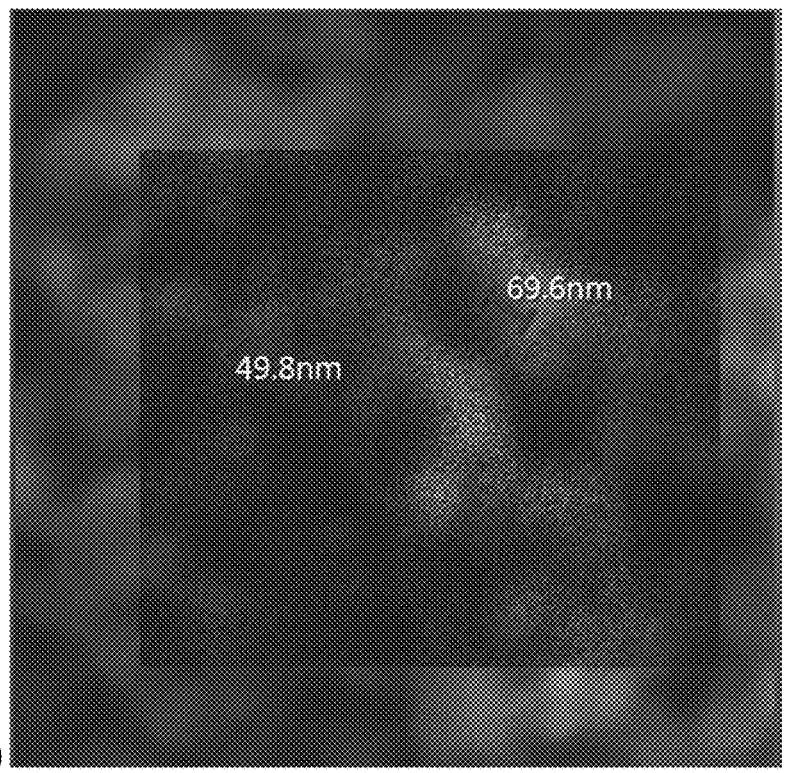
FIG. 10(a) is a SEM/EDX (TESCAN) micrograph showing the nanoparticles of Example 1A.
FIG. 10(b) shows the element mapping for these nanoparticles.
Figure 10:
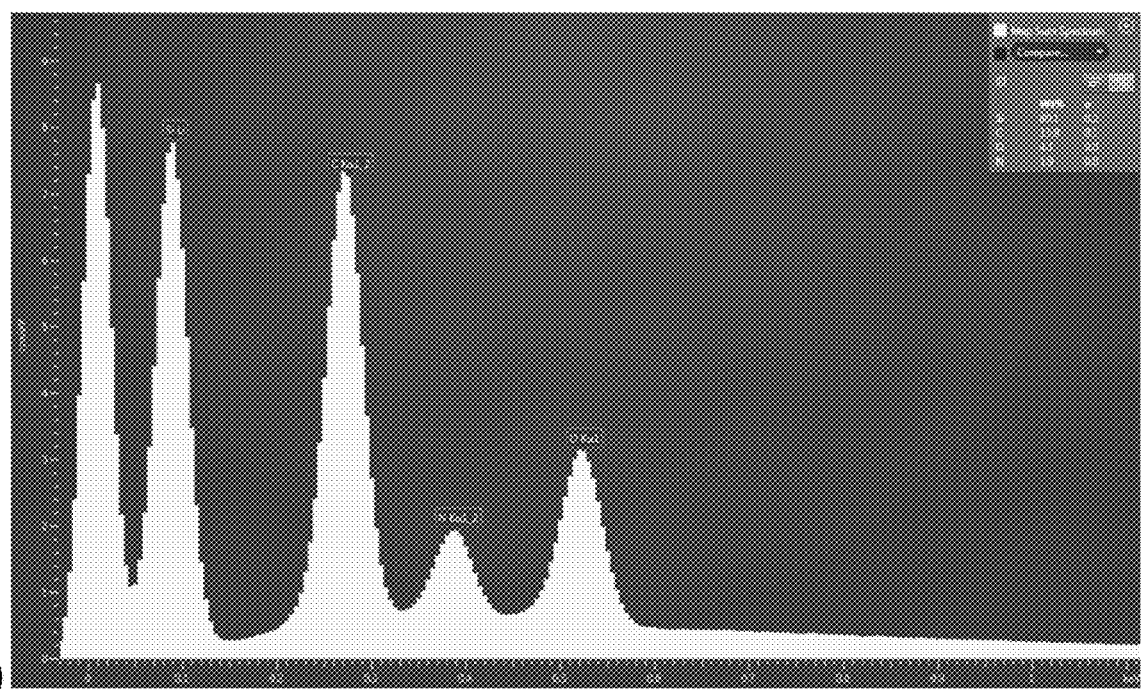

Example 1A—Nanoparticles According to the Invention Obtained Using a Silicon Metal Powder Another batch of nanoparticles of the invention was prepared according to the above process. FIG. 10(a) is the SEM/EDX (TESCAN) micrograph showing the nanoparticles obtained. FIG. 10(b) shows the element mapping for these nanoparticles. A nitrogen rich phase is clearly visible at the surface of the Si nanoparticles. The NM amount measured is around 2 wt %.

Example 2—Nanoparticles Without Passivation Layer (Comparative Example)

The same silicon metal powder used in Example 1 was used in this experiment. The silicon metal powder was also injected into the induction plasma torch using the same set-up as in Example 1. The experiment was also carried out under the same conditions as Example 1, except Ar was used as the quenching gas instead of $N_2$.

The resulting nanoparticles did not have a nitride passivation layer (as only silicon and oxygen were present). As a result, there was a greater amount of oxygen present in these nanoparticles, likely because of the formation of $SiO_x$ on the surface of the nanoparticles. This increase in the oxygen content can be seen in FIG. 5(a), where it is apparent that the presence of oxygen is greater (1.233% compared to 0.79%). Therefore, even with the small amount of nitrogen present in Example 1, the amount of oxygen present nonetheless decreased.

Figure 11:
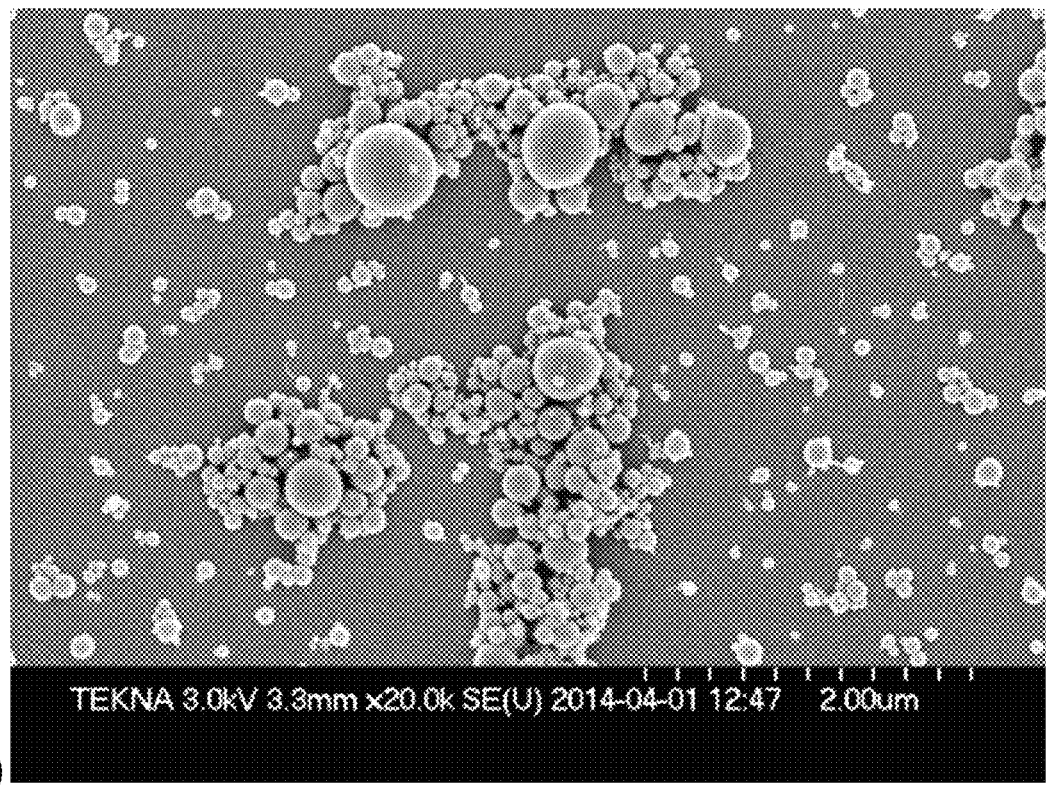
FIGS. 11(a) and 11(b) are SEM micrographs of the nanoparticles of Example 2 at different magnifications.
Figure 11:
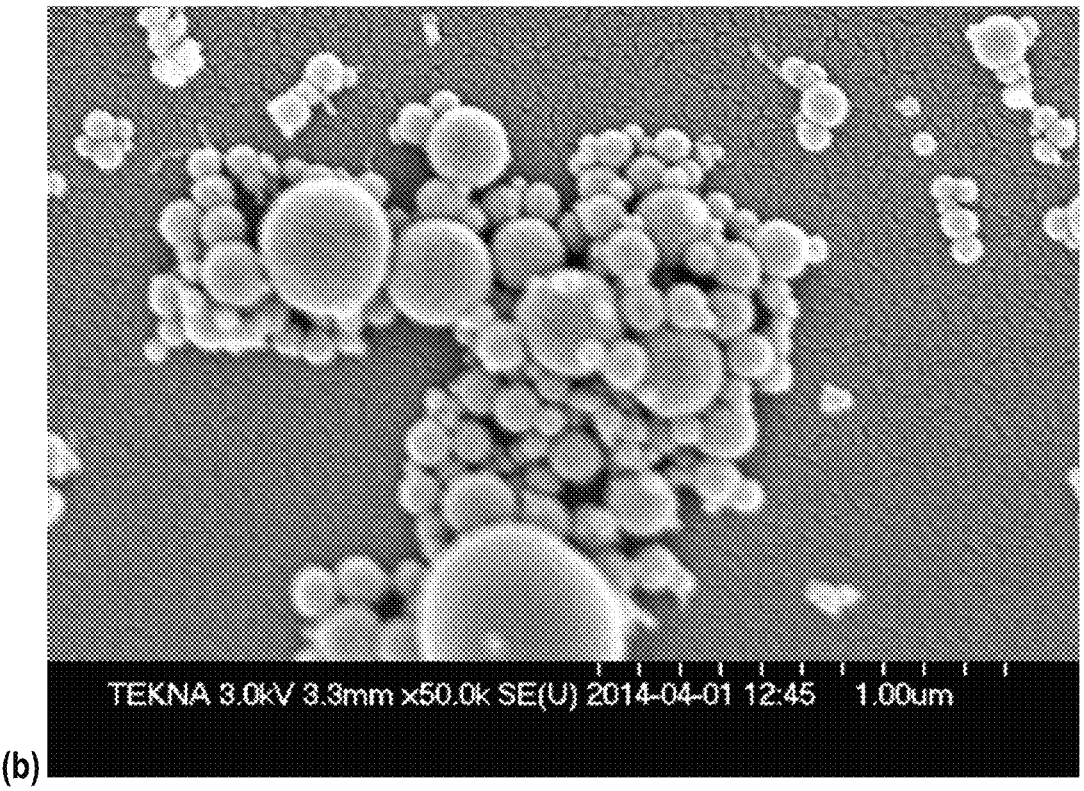
Figure 12:
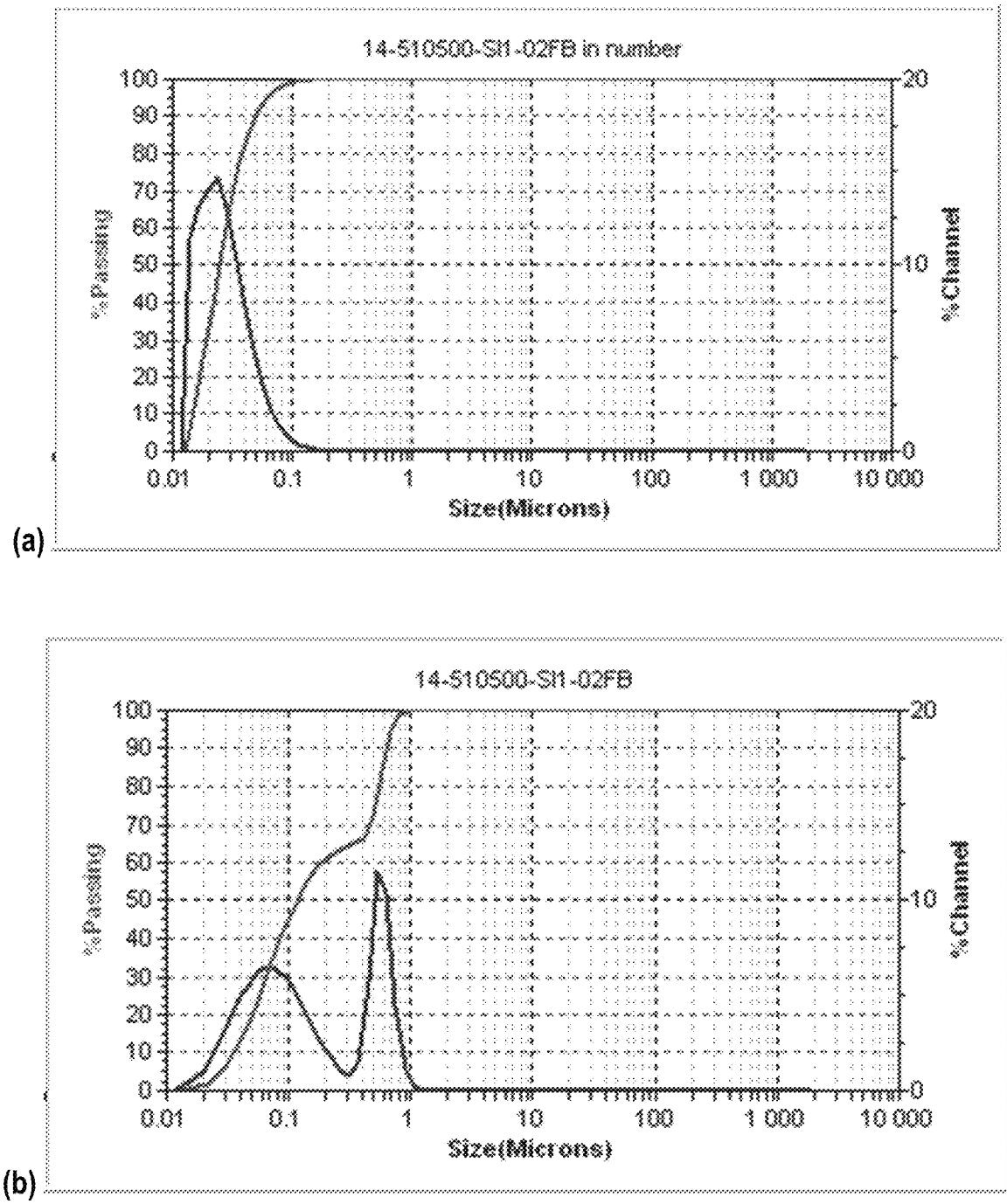
FIGS. 12(a) and 12(b) shows the particle size distribution (in number and in volume, respectively) of nanoparticles of Example 2 (without passivation layer, synthesized using argon as the quenching gas).

FIG. 11(a) and FIG. 11(b) are both micrographs showing the nanoparticles without passivation layer produced, while FIG. 12(a) and FIG. 12(b) show the particle size distribution of the nanoparticles without passivation layer produced, in number and in volume, respectively. The average size of the particles was also larger than when $N_2$ was used as a quenching gas (121 nm). This is because $N_2$ provides a higher cooling rate than Ar when used as a quenching gas due to the higher heat capacity and thermal conductivity of $N_2$ over Ar.

Example 3—Silicon Nanoparticles Obtained Using Silane

3a—Nanoparticles Without Passivation Layer

This example shows that silicon nanoparticles can be obtained from silane.

We produced silicon nanoparticles by feeding silane into an induction plasma torch instead of silicon metal powder. The quenching gas was argon. The set-up of the experiment was once again as seen in FIG. 1.

Figure 13:
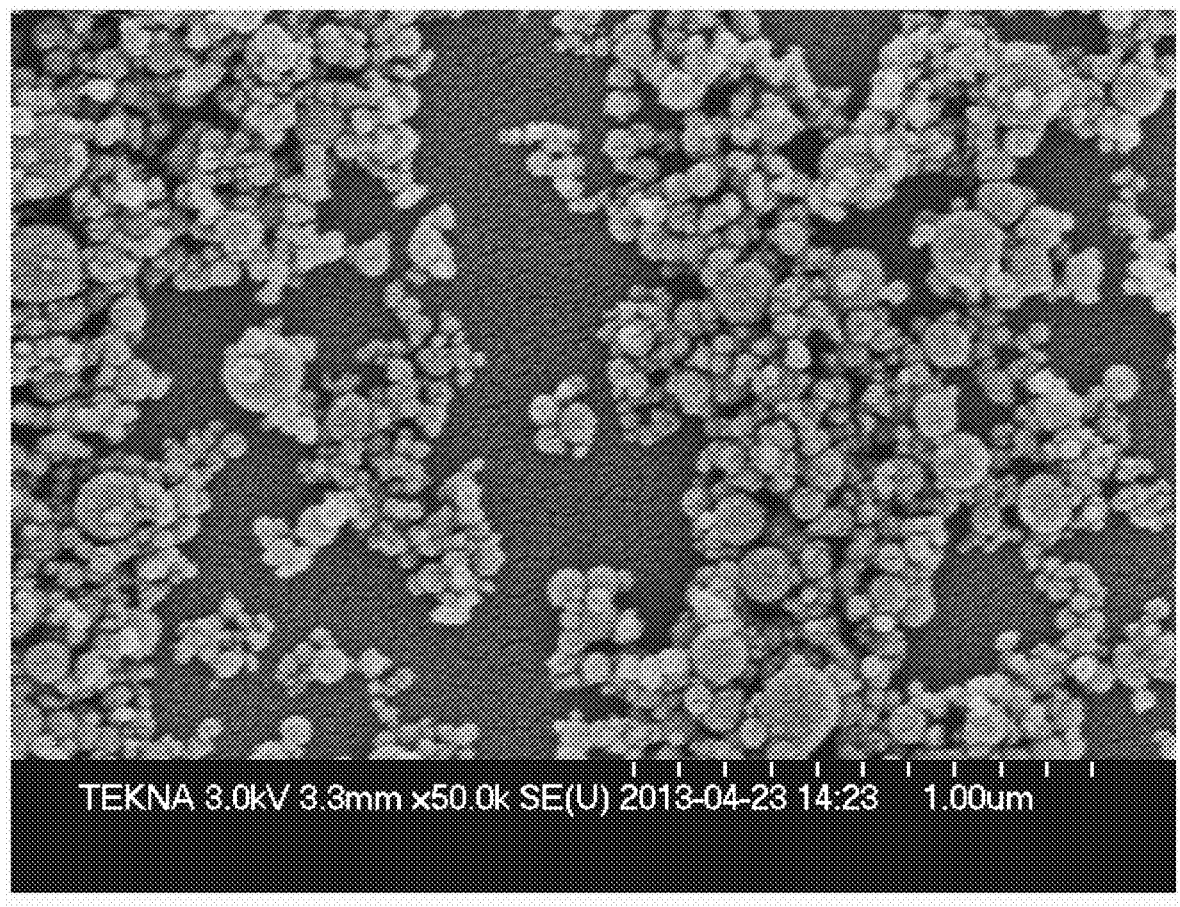
FIG. 13 is a SEM micrograph of nanoparticles of Example 3 (nanoparticles without passivation layer formed using silane as a precursor).

Silicon nanoparticles were obtained and can be seen in FIG. 13. With a 10 g sample size, the resulting BET was 54 $m^2$/g=48 nm. As no passivating gas precursor was present in the quenching gas, no nitride passivation layer was formed on the nanoparticles.

3b—Nanoparticles According to the Invention

Based on Example 3a, which shows that nanoparticles can be obtained using silane as a core precursor, nanoparticles with a passivation layer according to the invention can also be similarly obtained using silane. While the quenching gas was Argon in Example 3 (meaning no passivation layer was formed), nanoparticles with a passivation layer can be formed using a quenching gas containing a passivate gas precursor as defined above, using the same or similar conditions and set-up.

Example 4—Surface Functionalization of Silicon Nanoparticles

4a—Surface Functionalization of Nanoparticles Without Passivation Layer

Figure 14:
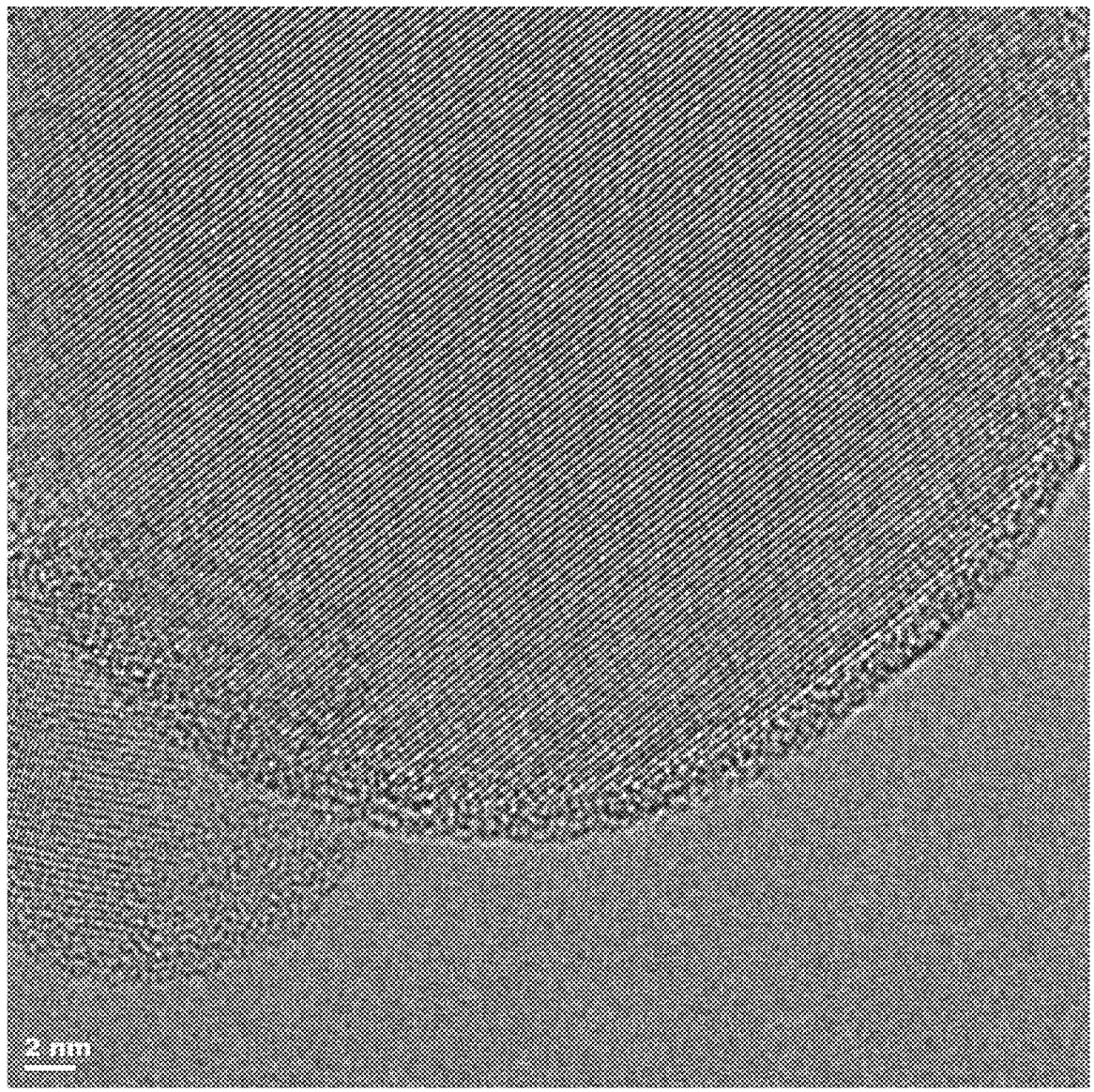
FIG. 14 is a micrograph of the silicon nanoparticles used as a starting material in Example 4.

This example shows that the surface of silicon nanoparticles without passivation layer can be functionalized. The starting nanoparticles can be seen in FIG. 14, where the native surface oxide layer is visible.

Figure 15:
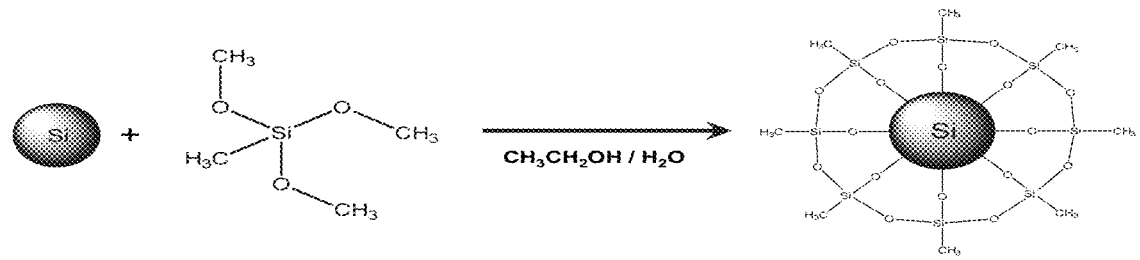
FIG. 15 shows the reaction scheme for surface modification of a silicon nanopowder with trimethoxymethylsilane.

10 grams of silicon nanoparticles without passivation layer were placed in a Nalgene beaker (600 mL) and 100 mL of a 2% HF was added. The mix was agitated with a magnetic stirrer until the gas evolution stopped (1 hour). A quantity of 2.0 mL of trimethoxysilane was added to the mix. The mix was stirred for two hours at room temperature in order for the surface modification reaction to happen (see the reaction scheme in FIG. 15).

The silicon nanoparticles were separated from the reaction mixture by liquid-liquid extraction using 50 mL of dichloromethane ($CH_2Cl_2$). The aqueous phase containing HF was separated from dichloromethane and the extraction phase was washed with water to remove any HF traces. The suspension of silicon nanoparticles was dried using a spay dryer (Mini spray dryer, Büchi, model B-290).

Figure 16:
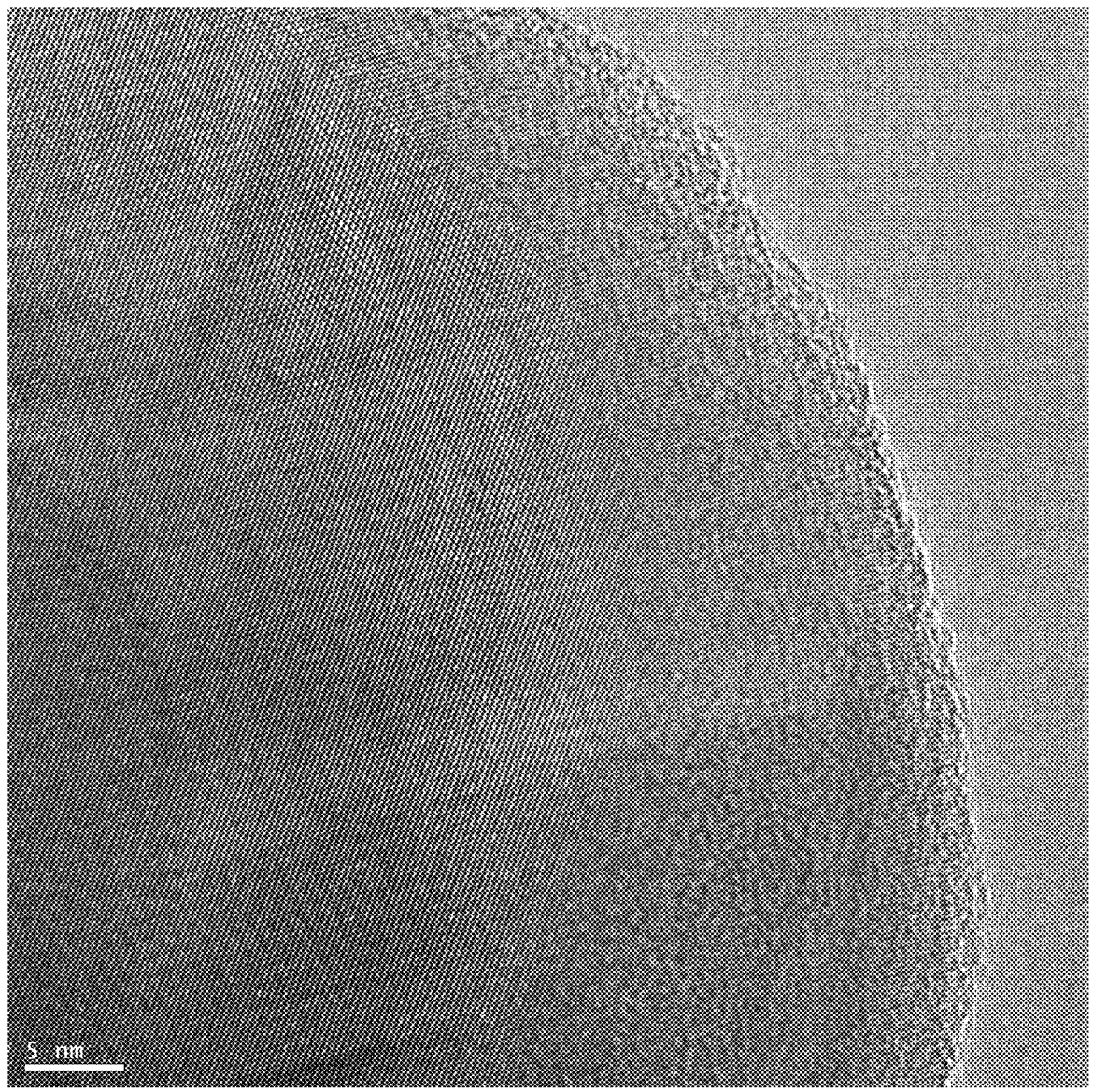
FIG. 16 shows a TEM micrograph of a silicon nanopowder particle functionalized with trimethoxyphenylsilane.

The silane layer covers silicon nanoparticles (3-4 nm thickness) (see a nanoparticle in FIG. 16) and protects it from moisture and air oxidation, water decomposition ($H_2$ evolution) and lowers reactivity with the electrolyte in the lithium-ion cell.

Figure 17:
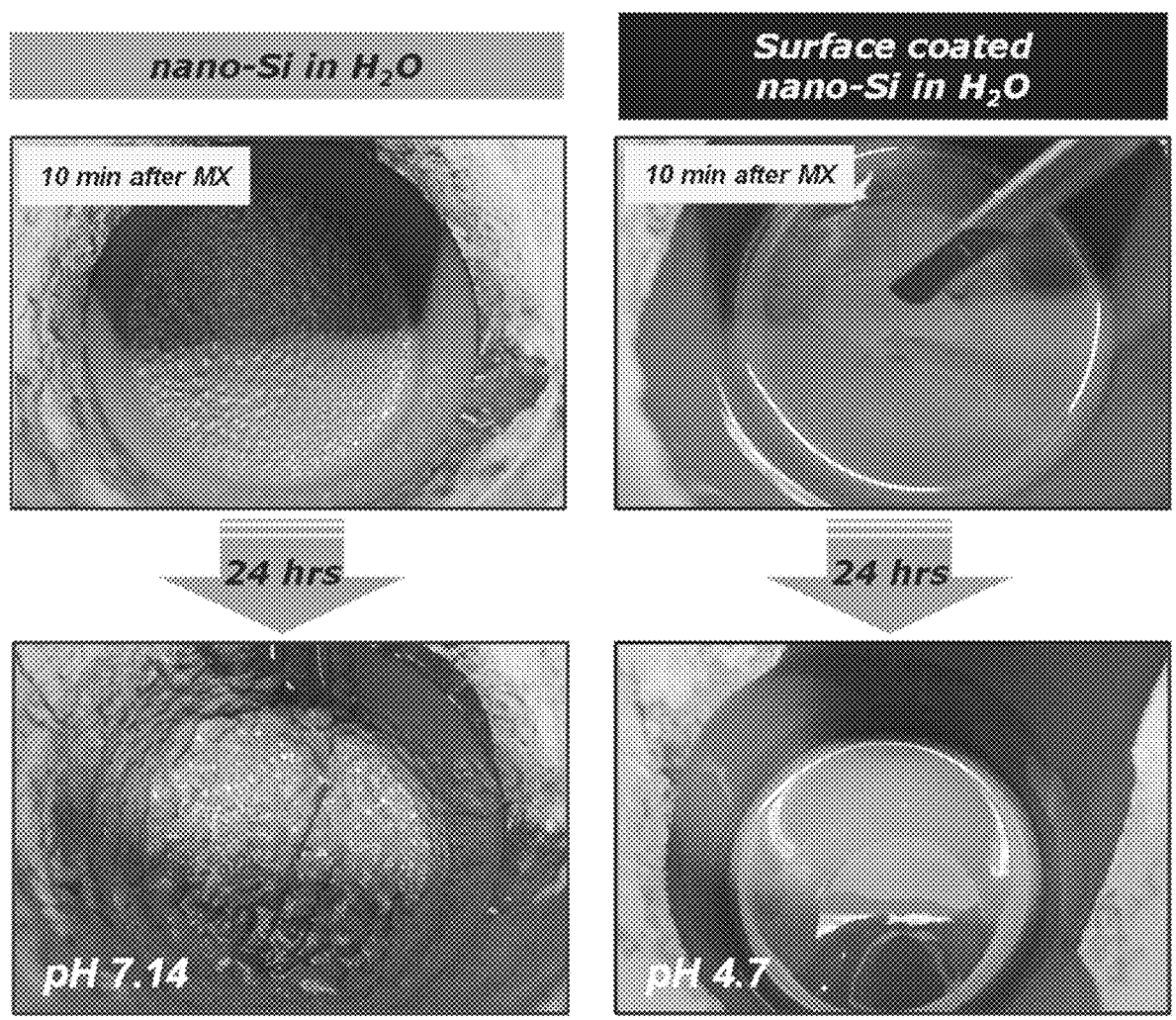
FIG. 17 shows the reactivity of silicon nanopowder with water solvent during electrode slurry fabrication.

The functionalized silicon nanopowder prevents the silicon from reacting with water to produce hydrogen gas, as shown in FIG. 17, where reactions between silicon nanoparticles without passivation layer and functionalized silicon nanoparticles when mixed with water are compared after 10 minutes and 24 hours.

4b—Electrochemical Tests of Functionalized Nanoparticles of Example 4a

The functionalized silicon nanopowder of Example 4a was mixed with acetylene carbon black (Denka Black) and sodium alginate (Aldrich) with a ratio of 50:25:25 using water as a solvent to achieve a viscosity of ~8500 cP for coating. A high-energy mixer (SPEX Certiprep) was used to de-agglomerate and mix the nanopowder. The slurry was coated on a copper foil to achieve loadings of approximately 0.6 mg/cm². The electrode was pre-dried at 75° C. in a convection oven and then carefully dried at 110° C. under mild vacuum for 12 h.

CR2032 coin cells (Hohsen) were assembled in a He-filled glove box using a Celgard 3501 separator and 200 µm lithium foil anode (FMC Lithium). The electrolyte was composed of 1 M $LiPF_6$ in a mixture of ethylene carbonate (EC) and diethyl carbonate (DEC) (7:3 by volume) with the addition of 10 V % of fluoroethylene carbonate (FEC) (Ube). The cells were galvanostatically charged and discharged at 25° C. using a VMP3 cycler (Bio-Logic) with a C/24 rate for formation cycles and a C/6 rate for life cycles over the voltage range of 0.005-1.0 V vs. Li/Li+.

Figure 18:
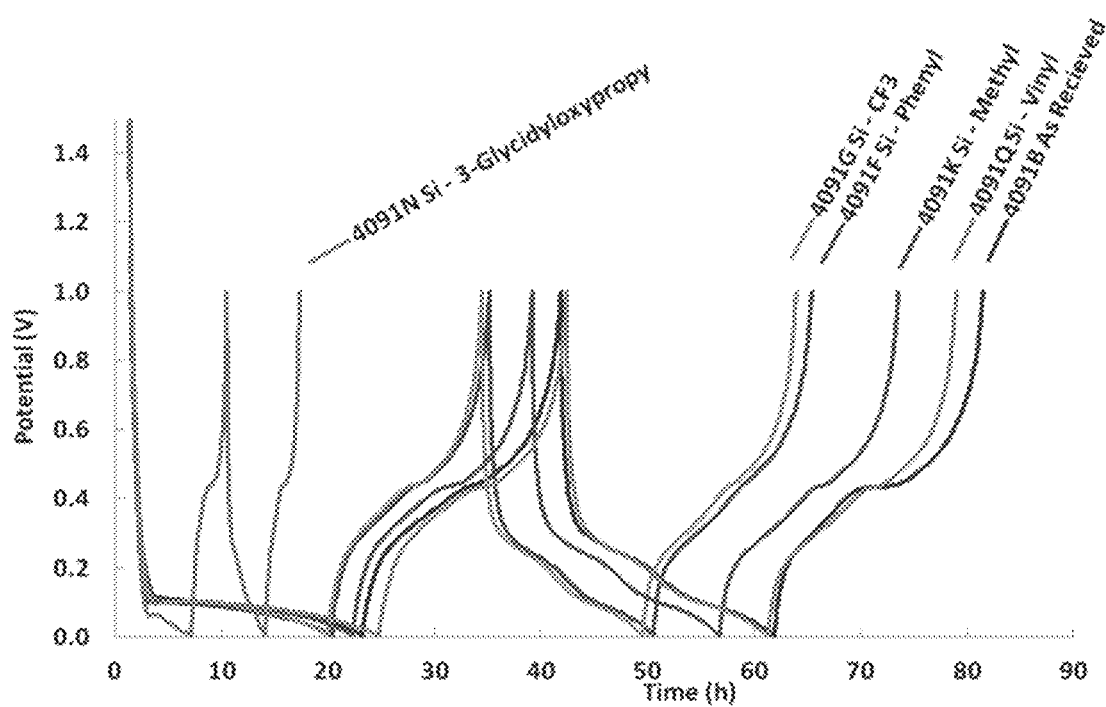
FIG. 18 shows formation cycling for electrodes made from as received silicon nanopowder and after functionalization treatment with different silanes (trimethoxyphenylsilane, trimethoxy(3,3,3-trifluoropropyl)silane, trimethoxymethylsilane, (3-glycidyloxypropyl)trimethoxysilane, and trimethoxyvinylsilane).
Figure 19:
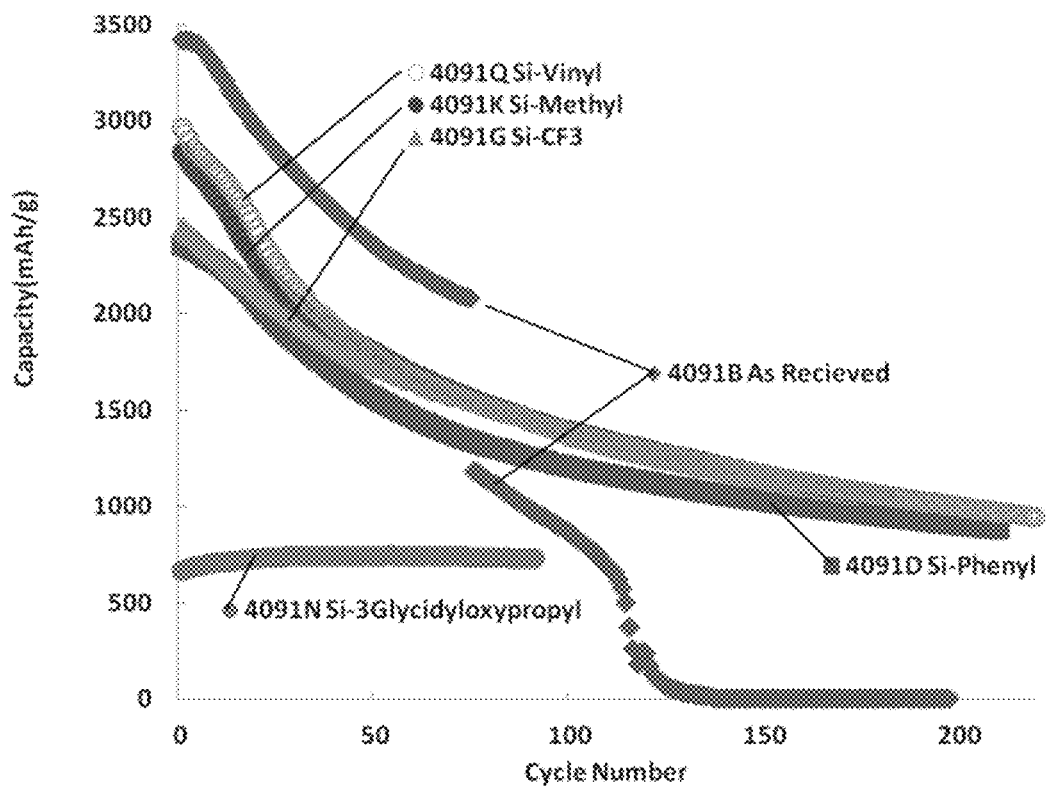
FIG. 19 shows stability cycling for electrodes made from as received silicon nanopowder and after functionalization treatment with different silanes (trimethoxyphenylsilane, trimethoxy(3,3,3-trifluoropropyl)silane, trimethoxymethylsilane, (3-glycidyloxypropyl)trimethoxysilane, and trimethoxyvinylsilane).

The result of the formation cycling is shown in FIG. 18. This figure shows the two first cycle of the cell (discharge/charge). The result of the stability cycling is shown in FIG. 19. These result shows lower initial capacity than and equivalent cycling stability as the nanoparticles of Example 1. It is important to note that the potentiostat was stopped during three days during the cycling experiment. All cells restarted from the same capacity after the stoppage, except the as received silicon nanoparticles. It is believed that the silane layer is protecting Si particles from reacting with electrolyte.

4c—Nanoparticles According to the Invention With Surface Functionalization

In light of Examples 4a and 4b, nanoparticles according to the present invention (i.e. with a passivation layer) can be similarly functionalised and used in the manufacture of an electrode. The functionalization and manufacture of an electrode are carried out using the same procedure as in Examples 4a and 4b, respectively, with the nanoparticles of the present invention used in place of the silicon nanoparticles without a passivation layer.

Figure 20:
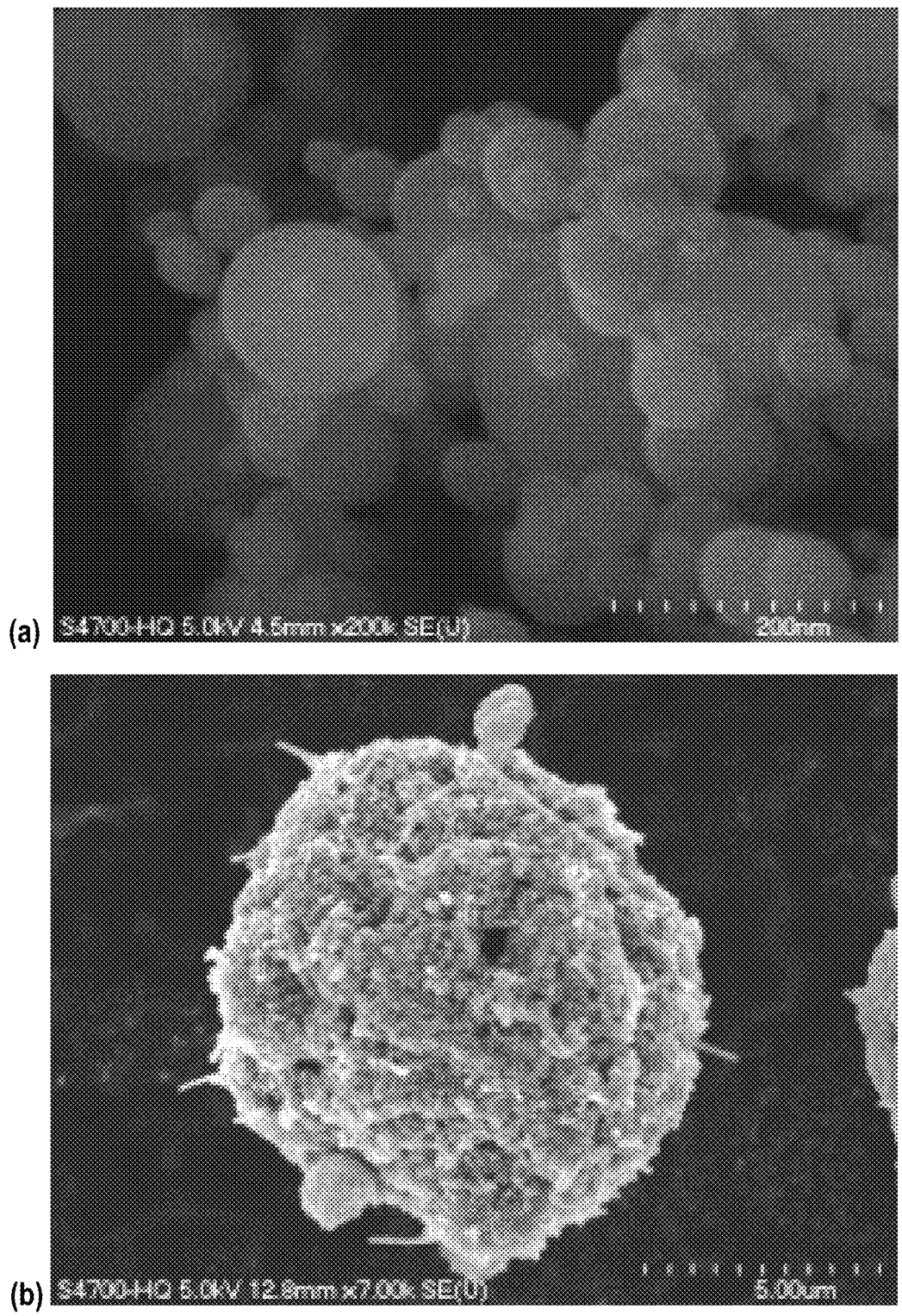
Figure 21:
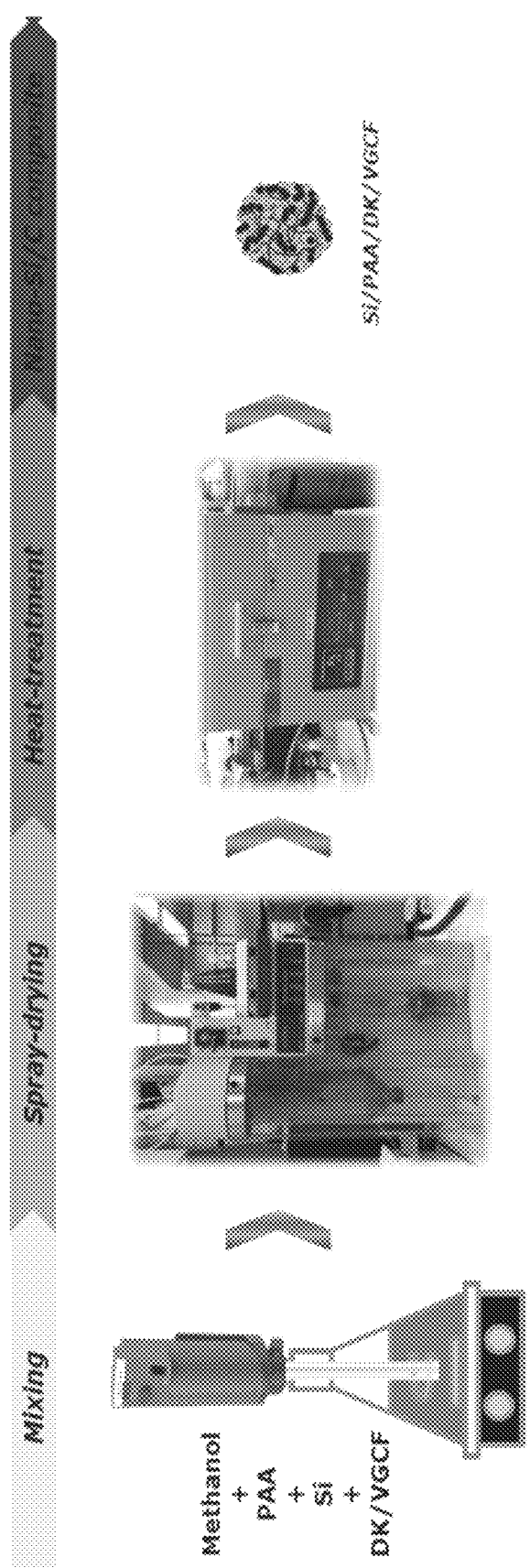
FIG. 21 shows the synthesis of silicon nanopowder/carbon composite using spray-drying.

Example 5—Preparation of Silicon Nanoparticle/Carbon Composites using Spray-drying 5a—Composites Comprising Nanoparticles Without a Passivation Layer Silicon nanoparticles without a passivation layer (shown in FIG. 20(a), poly(acrylic acid) (PAA), carbon black (Denka Black) and vapor grown carbon fibers (VGCF) were mixed in methanol. The suspension was dried using a spay dryer (Mini spray dryer, Büchi, model B-290). Then, the composite particles were pyrolyzed using a tube furnace in inert atmosphere ($N_2$) (see the reaction steps in FIG. 21).

The resulting silicon nanoparticle/carbon composite material is shown FIG. 20(b).

Figure 22:
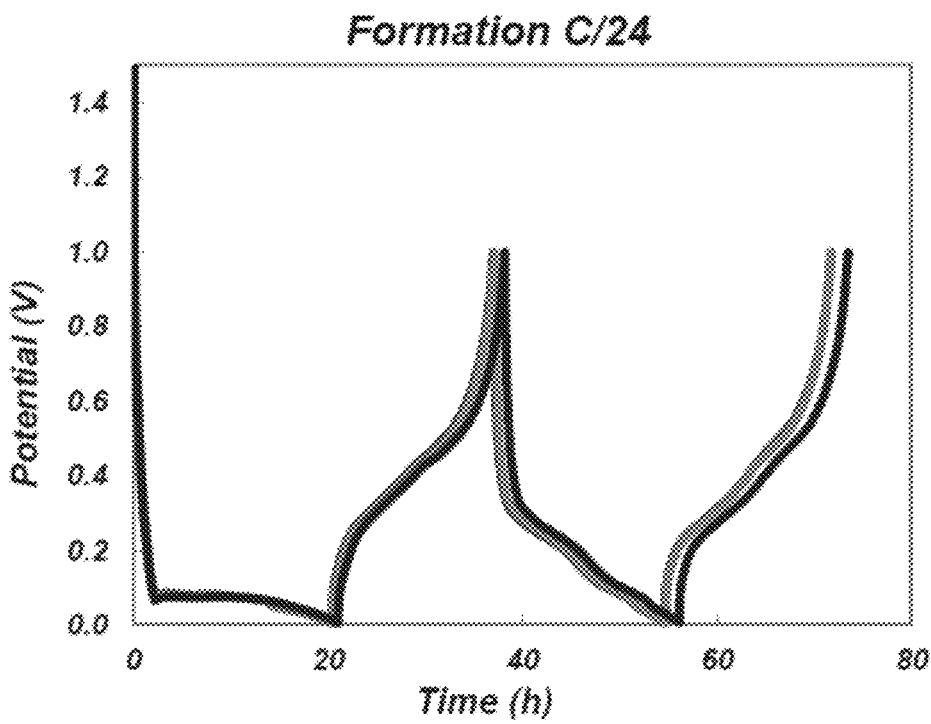
FIG. 22 shows formation cycling for an electrode made from the composite silicon nanopowder/carbon particles.
Figure 23:
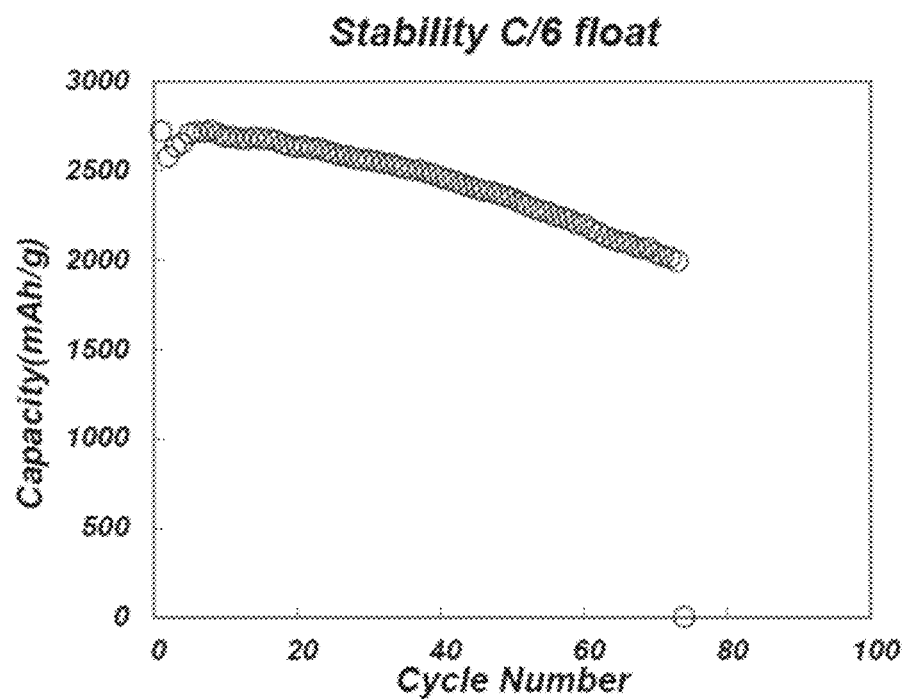
FIG. 23 shows stability cycling for an electrode made from the composite silicon nanopowder/carbon particles.

Electrodes were prepared as in example 4b. The result of the formation cycling is shown in FIG. 22. The result of the stability cycling is shown in FIG. 23.

5b—Composites Comprising Nanoparticles According to the Invention

In light of Example 5a, a composition of nanoparticles according to the invention and carbon composite can also be formed using the procedure of Example 5a, with the nanoparticles according to the invention used in place of the silicon nanoparticles without passivation layer.

This may thus produce a nanoparticles/carbon composite in which the nanoparticles according to the invention are coated with a conductive carbon layer. This composite can then be used to make an electrode using the procedure of Example 4b, with the composite used in place of the functionalised silicon nanopowder of Example 4a. As the passivation layer will reduce the presence of oxide layers on the nanoparticles, the composite comprising nanoparticles according to the invention can provide improved cycle performance, as well as improved battery performance due to the reduction of irreversible capacity.

REFERENCES

The present description refers to a number of documents, the content of which is herein incorporated by reference in their entirety. These documents include, but are not limited to, the following:

Dosaj, V., M. Kroupa, and R. Bittar, Silicon and Silicon Alloys, Chemical and Metallurgical, in Kirk-Othmer Encyclopedia of Chemical Technology. 2000, John Wiley & Sons, Inc.

Boulos, M., Purification of metallurgical grade silicon, patent U.S. Pat. No. 4,379,777. 1983.

Boulos, M. and J. Jurewicz, High performance induction plasma torch with a water-cooled ceramic confinement tube, patent U.S. Pat. No. 5,200,595. 1993, Université de Sherbrooke.

Guo, J., et al., *Development of Nanopowder Synthesis Using Induction Plasma*. Plasma Science and Technology, 2010. 12 (2): p. 188.

Scoyer, J. B. B. H., et al., *Submicron sized silicon powder with low oxygen content*, Umicore, Editor. 2012: WO.

Scoyer, J., et al., Negative electrode material for lithium-ion batteries. WO 2012/000854.

Put, S., et al., Positively charged silicon for lithium-ion batteries. 2013, WO 2013/087780.

Zaghib, K., A. Guerfi, and D. Leblanc, Particulate anode materials and methods for their preparation. 2014.

Leblanc, D., et al., Silicon as anode for high-energy lithium ion batteries: From molten ingot to nanoparticles. Journal of Power Sources, 2015. 299: p. 529-536.

Leblanc, D., et al., In situ transmission electron microscopy observations of lithiation of spherical silicon nanopowder produced by induced plasma atomization. Journal of Power Sources, 2015. 279(0): p. 522-527.

Boulos, M., Jurewicz, J. and Guo, J., *Induction plasma synthesis of nanopowders*, patent U.S. Pat. No. 8,013,269. 2011.

Boulos, M., Jurewicz, J. and Guo, J., *Plasma reactor for the synthesis of nanopowders and materials processing*, patent application US 2012/201266A1. 2012.

Boulos, M., Jurewicz, J. and Guo, J., *Plasma reactor for the synthesis of nanopowders and materials processing*, patent U.S. Pat. No. 9,516,734. 2016.

Boulos, M. et al., Plasma synthesis of metal oxide nanopowder and apparatus therefor, patent U.S. Pat. No. 6,994,837. 2006.

Boulos, M. et al., Apparatus for plasma synthesis of metal oxide nanopowder, patent U.S. Pat. No. 7,501,599. 2009.

Boulos, M. et al., *Plasma synthesis of nanopowders, patent U.S. Pat. No. 8,859,931.* 2014.

Boulos, M., Jurewicz, J. and Nessim, C., Plasma synthesis of titanium dioxide nanopowder and powder doping and surface modification process, patent application US 2002/155059A1. 2002.

Boulos, M. et al., *High performance induction plasma torch*, patent U.S. Pat. No. 9,380,693. 2016.

Boulos, M., and Jurewicz, J., Multi-coil induction plasma torch for solid state power supply, patent U.S. Pat. No. 6,693,253. 2004.

The invention claimed is:

1. Nanoparticles comprising a core and a passivation layer covering the core,
    wherein the core comprises silicon or an alloy thereof,
    wherein the passivation layer is a layer of nitride of the silicon or alloy thereof,
    wherein the nanoparticles are substantially spherical in shape and have an average particle size of at least 70 nm,
    wherein the passivation layer is at most about 5 nm in thickness, and
    wherein the nanoparticles are substantially free of $SiO_x$ and SiOH surface species.

2. The nanoparticles of claim 1, wherein the nanoparticles further comprise a layer of conductive carbon covering at least a portion of the surface of the nanoparticles.

3. The nanoparticles of claim 1, wherein the nanoparticles are comprised within a composite Si/carbon agglomerate.

4. The nanoparticles of claim 1, having an average particle size between about 70 nm and about 260 nm.

5. The nanoparticles of claim 1, having a mean diameter between about 40 nm and about 200 nm.

6. Nanoparticles comprising a core and a passivation layer covering the core, wherein the core comprises silicon or an alloy thereof, and wherein the nanoparticles are manufactured by a method comprising:
    providing a core precursor comprising the silicon or alloy thereof;
    providing a plasma reactor comprising an induction plasma torch generating a plasma at a temperature configured for producing a vapor of the silicon or alloy thereof from the core precursor, wherein the plasma torch is in fluid communication with a quenching zone located downstream from the plasma torch, and wherein the quenching zone is cooled down by a quenching gas to a temperature configured for condensing of the vapor;
    feeding the core precursor into the plasma torch, thereby producing the vapor of the silicon or alloy thereof; and
    migrating the vapor to the quenching zone, thereby cooling the vapor and allowing condensation of the vapor into the core,
    wherein the quenching gas comprises a passivating gas precursor, wherein the passivating gas precursor is configured for reacting with the surface of the core in the quenching zone to produce the passivation layer covering the core, thereby producing said nanoparticles, and wherein the passivating gas precursor is ammonia or nitrogen;
    wherein the passivation layer is a layer of nitride of the silicon or alloy thereof,
    wherein the nanoparticles are substantially spherical in shape and have an average particle size of at least 70 nm,
    wherein the passivation layer is at most about 5 nm in thickness, and
    wherein the nanoparticles are substantially free of $SiO_x$ and SiOH surface species.

7. A method of manufacturing nanoparticles, wherein each nanoparticle comprises a core and a passivation layer covering the core, wherein the core comprises silicon or an alloy thereof, wherein the passivation layer is a layer of nitride of the silicon or alloy thereof, wherein the nanoparticles are substantially spherical in shape and have an average particle size between 70 nm and about 300 nm, wherein the passivation layer is at most about 5 nm in thickness, and wherein the nanoparticles are substantially free of $SiO_x$ and SiOH surface species, and wherein the method comprises:
    providing a core precursor comprising the silicon or alloy thereof;
    providing a plasma reactor comprising an induction plasma torch, wherein the plasma torch generates a plasma at a temperature configured for producing a vapor of the silicon or alloy thereof from the core precursor, wherein the plasma torch is in fluid communication with a quenching zone located downstream from the plasma torch, and wherein the quenching zone is cooled down by a quenching gas to a temperature configured for condensing the vapor;
    feeding the core precursor into the plasma torch, thereby producing the vapor of the silicon or alloy thereof; and
    migrating the vapor to the quenching zone, thereby cooling the vapor and allowing condensation of the vapor into the core,
    wherein the quenching gas comprises a passivating gas precursor, wherein the passivating gas precursor is configured for reacting with the surface of the core in the quenching zone to produce the passivation layer covering the core, thereby producing said nanoparticles, and wherein the passivating gas precursor is ammonia or nitrogen.

8. The method of claim 1, wherein the core precursor is:
    the silicon or alloy thereof in metal form or
    a hydride or chloride of the silicon or alloy thereof.

9. The method of claim 1, wherein the core precursor is in micropowder form and is metallurgical grade silicon metal (MG-Si), or ferrosilicon.

10. The method of claim 1, wherein the core precursor is in gaseous form and is silane, trichlorosilane, or silicon tetrachloride.

11. The method of claim 1, wherein feeding the core precursor into the plasma torch comprises mixing the core precursor with a carrier gas, wherein the carrier gas transports the core precursor into and through the plasma torch followed by transporting the vapor of the silicon or alloy thereof to the quenching zone.

12. The method of claim 1, further comprising discharging the nanoparticles from the plasma reactor.

13. The method of claim 12, further comprising producing a layer of conductive carbon on the nanoparticles.

14. The method of claim 13, wherein the layer of conductive carbon is produced by:
    mixing the nanoparticles with a carbon precursor to form a mixture; and
    pyrolizing the mixture in the absence of oxygen to form a layer of conductive carbon on at least a portion of the surface of the nanoparticles.

15. The method of claim 12, further comprising activating the surface of the nanoparticles, wherein the activating comprises treatment with an aqueous acid solution followed by functionalizing the nanoparticles.

16. The method of claim 15, wherein the nanoparticles are mixed with the aqueous acid solution and then a functionalizing reagent is added to the mixture.

17. The method of claim 16, wherein the functionalizing reagent is trimethoxysilane, trimethoxymethylsilane, trimethoxy(vinyl)silane, or trimethoxyphenylsilane.

18. The method of claim 12, further comprising producing of a composite Si/carbon agglomerate.

19. The method of claim 18, wherein the composite Si/carbon agglomerate is produced by:
    mixing the nanoparticles with a carbon precursor to form a mixture, and
    pyrolizing the mixture to form the composite Si/carbon agglomerate.

\* \* \* \* \*